(12) United States Patent
Nakamura et al.

(10) Patent No.: US 9,462,646 B2
(45) Date of Patent: Oct. 4, 2016

(54) LIGHT-EMITTING DEVICE AND CAMERA

(71) Applicant: Semiconductor Energy Laboratory Co., Ltd., Kanagawa-ken (JP)

(72) Inventors: Daiki Nakamura, Kanagawa (JP); Nobuharu Ohsawa, Kanagawa (JP); Hisao Ikeda, Kanagawa (JP); Akihiro Kaita, Kanagawa (JP); Shunpei Yamazaki, Tokyo (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 0 days.

(21) Appl. No.: 15/053,401

(22) Filed: Feb. 25, 2016

(65) Prior Publication Data
US 2016/0174313 A1  Jun. 16, 2016

Related U.S. Application Data

(63) Continuation of application No. 14/315,675, filed on Jun. 26, 2014, now Pat. No. 9,277,627.

(30) Foreign Application Priority Data

Jun. 27, 2013 (JP) ................................. 2013-134799

(51) Int. Cl.
*H05B 37/02* (2006.01)
*H05B 33/08* (2006.01)
*G03B 15/05* (2006.01)

(52) U.S. Cl.
CPC ........... *H05B 33/0818* (2013.01); *G03B 15/05* (2013.01); *H05B 33/0845* (2013.01); *H05B 33/0896* (2013.01)

(58) Field of Classification Search
CPC .. H05B 37/02; H05B 37/0209; H05B 33/08; H05B 33/0842; H05B 33/0848; H05B 3/0854; H04N 5/2256
USPC ............ 315/209 R, 225, 226, 291, 307, 308, 315/360–363
See application file for complete search history.

(56) References Cited

U.S. PATENT DOCUMENTS

| 7,598,927 B2 | 10/2009 | Yamazaki et al. |
| 8,319,714 B2 | 11/2012 | Kojima et al. |

(Continued)

FOREIGN PATENT DOCUMENTS

| JP | 2004-109430 A | 4/2004 |
| JP | 2007-163876 A | 6/2007 |

(Continued)

*Primary Examiner* — Jimmy Vu
(74) *Attorney, Agent, or Firm* — Husch Blackwell LLP

(57) ABSTRACT

To provide a light-emitting device whose amount of light can be adjusted, or the like. The amount of light emitted from the light-emitting device can be adjusted by controlling the magnitude of the constant current pulse by a control signal. Specifically, the light-emitting device includes a constant current supply configured to be supplied with a control signal and a control pulse signal and configured to supply a constant current pulse; a control device configured to supply the control signal; a driver circuit configured to supply the control pulse signal; and a light-emitting panel configured to be supplied with the constant current pulse. The control signal is a signal for controlling the magnitude of the constant current pulse. The light-emitting panel includes a light-emitting element. The current density of the light-emitting element is greater than or equal to 10 mA/cm² and less than or equal to 1000 mA/cm².

15 Claims, 11 Drawing Sheets

(56) References Cited

U.S. PATENT DOCUMENTS

| | | |
|---|---|---|
| 8,550,907 B2 | 10/2013 | Yamazaki et al. |
| 8,634,021 B2 * | 1/2014 | Kawakami ............ G03B 15/05 348/223.1 |
| 8,710,762 B2 | 4/2014 | Takahashi et al. |
| 2008/0185971 A1 | 8/2008 | Kinoshita |
| 2009/0096385 A1 | 4/2009 | Yamauchi |
| 2010/0066257 A1 | 3/2010 | Lin et al. |
| 2011/0101880 A1 | 5/2011 | Ribarich |
| 2012/0205679 A1 | 8/2012 | Hiroki et al. |
| 2014/0347555 A1 | 11/2014 | Hirakata et al. |

FOREIGN PATENT DOCUMENTS

| | | |
|---|---|---|
| JP | 2009-130132 A | 6/2009 |
| JP | 2009-295769 A | 12/2009 |
| JP | 2010-004692 A | 1/2010 |
| JP | 2010-028366 A | 2/2010 |
| JP | 2012-129478 A | 7/2012 |

* cited by examiner

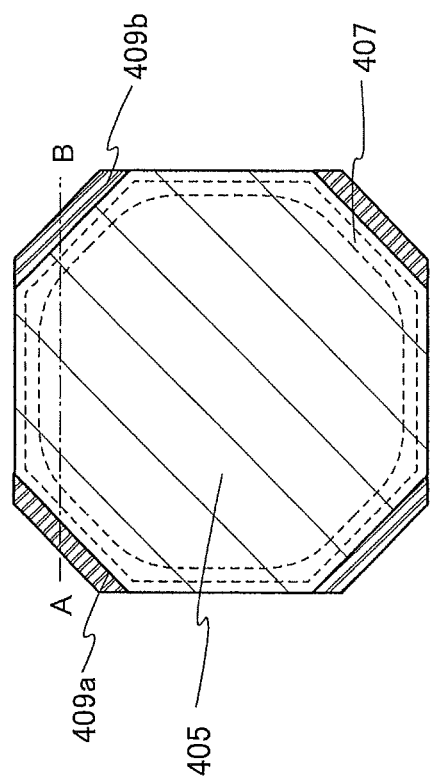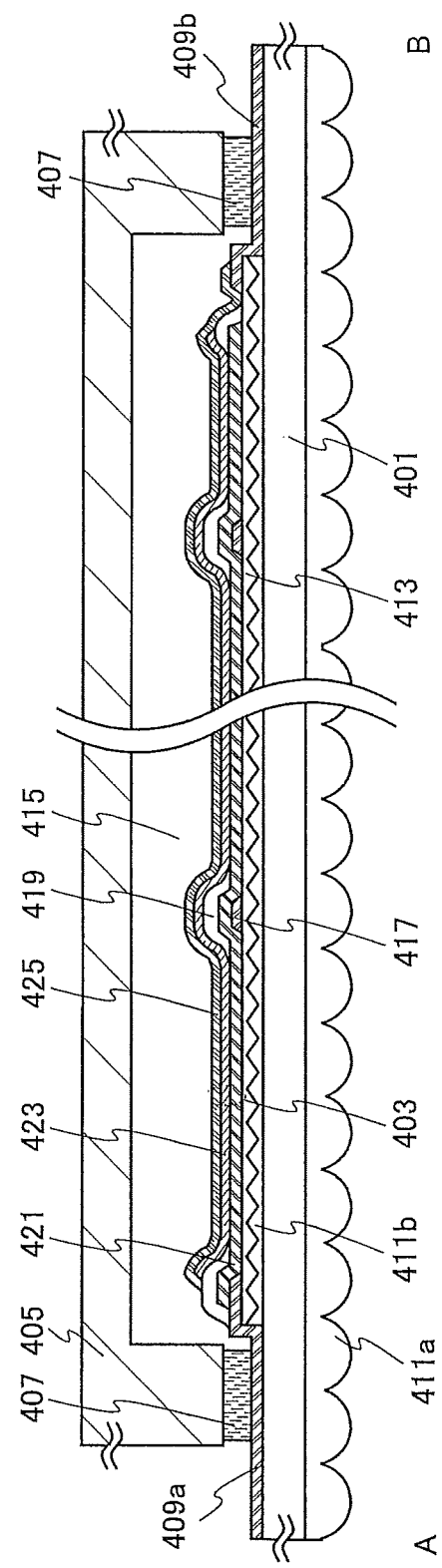

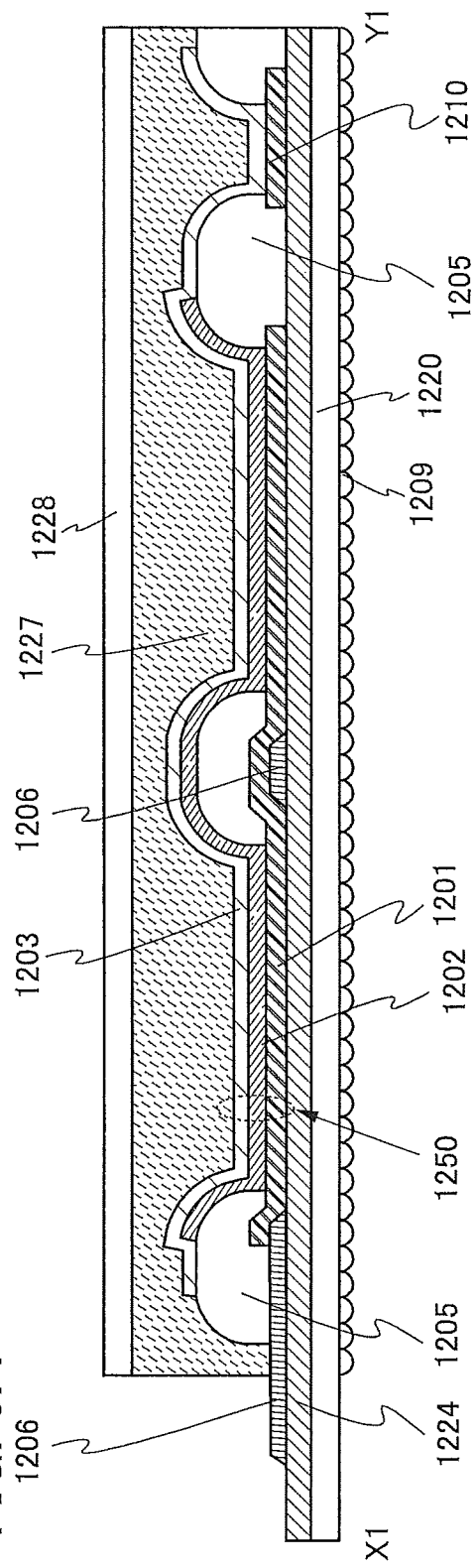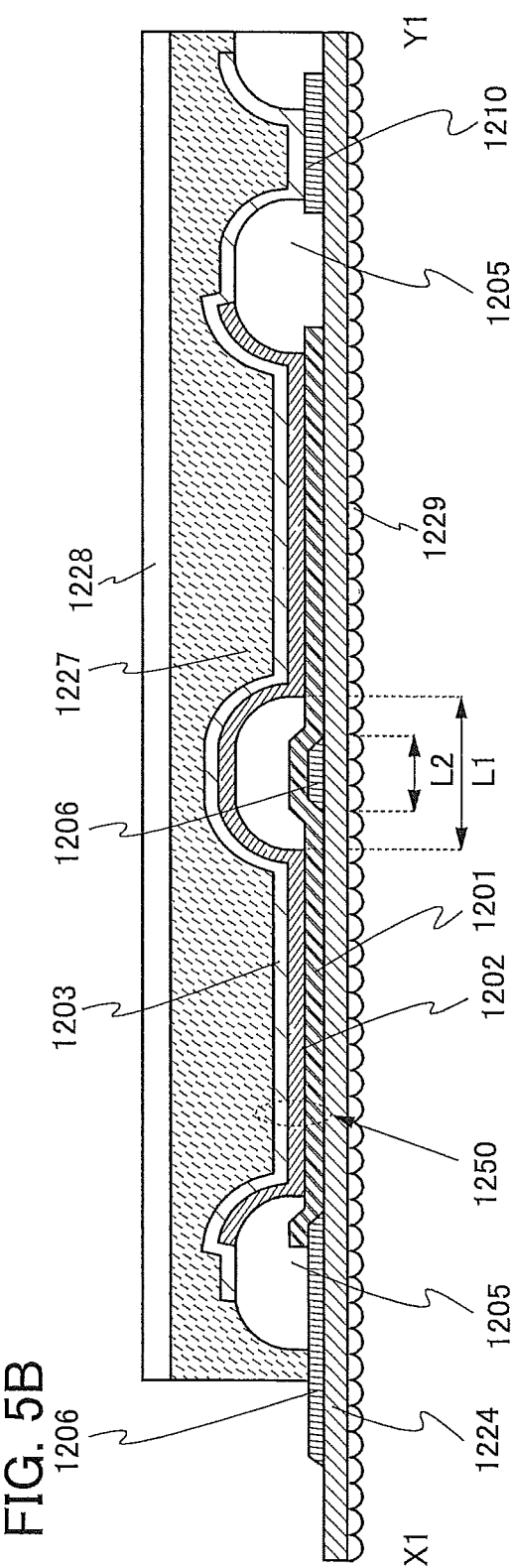

LIGHT-EMITTING DEVICE AND CAMERA

This application is a continuation of copending U.S. application Ser. No. 14/315,675, filed on Jun. 26, 2014 which is incorporated herein by reference.

BACKGROUND OF THE INVENTION

1. Field of the Invention

One embodiment of the present invention relates to a light-emitting device, an electronic device, and a method for driving the light-emitting device or the electronic device. In particular, one embodiment of the present invention relates to a light-emitting device and an electronic device using an organic electroluminescence (hereinafter also referred to as EL) phenomenon, and a method for driving the light-emitting device or the electronic device.

2. Description of the Related Art

Research and development have been extensively conducted on light-emitting elements using organic electroluminescence (EL) (also referred to as organic EL elements). In a basic structure of an organic EL element, a layer containing a light-emitting organic compound (also referred to as an EL layer) is provided between a pair of electrodes. By applying voltage to this element, light emission from the light-emitting organic compound can be obtained.

Since an organic EL element can be formed in a film form, an element with a large area can be easily formed. Thus, organic EL elements also have great potential as planar light sources which can be applied to lighting devices and the like.

For example, a lighting device including an organic EL element is disclosed in Patent Document 1.

REFERENCE

Patent Document

[Patent Document 1] Japanese Published Patent Application No. 2009-130132

SUMMARY OF THE INVENTION

Cameras are equipped with flashes for taking photographs in a dark place.

Smaller and/or lighter cameras are demanded for easy portability.

However, as the size of a flash decreases, the shape of its light-emitting portion becomes more linear or point-like. Light from a light source travels in a straight line; therefore, a smaller light source casts a sharper shadow of an object. Thus, when a photograph of a human face is taken in a dark place using a flash, for example, a shadow of a nose might be cast on a cheek.

In addition, when the intensity of a flash is excessively high, a portion having different brightness in reality becomes uniformly white in a photograph (blown-out highlights) in some cases. In contrast, when the intensity of a flash is too low, a dark portion of a photograph becomes uniformly black (blocked up shadows) in some cases. For these reasons, a flash whose amount of light can be adjusted depending on an environment or a subject has been required.

For example, the amount of light of a light-emitting diode using an inorganic material can be adjusted, but the light-emitting diode is a point light source. When a point light source, a surface light source, and a line light source emit the same amount of light, it is necessary that the point light source have a larger amount of light per unit area or a longer emission time than the surface light source and the line light source. Since the light-emitting diode generates heat when it emits light, a prolonged light emission or a light emission with a large amount of current increases the amount of heat generation of the light-emitting diode; thus, a decrease in lifetime or breakage of an element might occur. In terms of reliability, a current greater than or equal to 1.0 A or 1.5 A is difficult to make flow even in a high-luminance light-emitting diode.

Therefore, an object of one embodiment of the present invention is to provide a light-emitting device whose amount of light can be adjusted. Another object of one embodiment of the present invention is to provide a highly reliable light-emitting device. Another object of one embodiment of the present invention is to provide a light-emitting device with low power consumption. Another object of one embodiment of the present invention is to provide a light-emitting device that is less likely to produce a shadow. Another object of one embodiment of the present invention is to reduce the size or weight of a light-emitting device.

In one embodiment of the present invention, there is no need to achieve all the objects.

A light-emitting device of one embodiment of the present invention includes a constant current supply configured to be supplied with a control signal and a control pulse signal and configured to supply a constant current pulse; a control device configured to supply the control signal; a driver circuit including a start switch and configured to supply the control pulse signal in accordance with switching operation of the start switch; and a light-emitting panel configured to be supplied with the constant current pulse. The control signal is a signal for controlling the magnitude of the constant current pulse. The light-emitting panel includes a light-emitting element. The current density of the light-emitting element is greater than or equal to 10 mA/cm$^2$ and less than or equal to 1000 mA/cm$^2$.

In the above light-emitting device, for example, the driver circuit may supply the control pulse signal so that the constant current supply supplies a constant current with a half width of more than or equal to 1 millisecond and less than or equal to 1000 milliseconds.

A light-emitting device of one embodiment of the present invention includes a switching circuit configured to be supplied with a constant current and a control pulse signal and configured to supply a constant current pulse; a constant current supply configured to be supplied with a control signal and configured to supply the constant current; a control device configured to supply the control signal; a driver circuit including a start switch and configured to supply the control pulse signal in accordance with switching operation of the start switch; and a light-emitting panel configured to be supplied with the constant current pulse. The control signal is a signal for controlling the magnitude of the constant current pulse. The light-emitting panel includes a light-emitting element. The current density of the light-emitting element is greater than or equal to 10 mA/cm$^2$ and less than or equal to 1000 mA/cm$^2$.

In the above light-emitting device, for example, the driver circuit may supply the control pulse signal so that the switching circuit supplies a constant current with a half width of more than or equal to 1 millisecond and less than or equal to 1000 milliseconds.

The above light-emitting device may further include an optical sensor that supplies a first detection signal in accordance with the detected amount of light. In that case, the control device includes an arithmetic unit and to which the first detection signal is supplied. In the arithmetic unit, an arithmetic operation is performed using the first detection signal. The control device supplies a control signal so that the constant current supply supplies a constant current in accordance with the result of the arithmetic operation.

The above light-emitting device may further include a distance sensor that supplies a second detection signal in accordance with the detected distance. In that case, the control device includes an arithmetic unit and to which the second detection signal is supplied. In the arithmetic unit, an arithmetic operation is performed using the second detection signal. The control device supplies a control signal so that the constant current supply supplies a constant current in accordance with the result of the arithmetic operation.

The above light-emitting device may include both the optical sensor and the distance sensor. In that case, the control device includes an arithmetic unit and to which the first detection signal and the second detection signal are supplied. In the arithmetic unit, an arithmetic operation is performed using the first detection signal and the second detection signal. The control device supplies a control signal so that the constant current supply supplies a constant current in accordance with the result of the arithmetic operation.

In the above light-emitting device, the light-emitting panel may include a support substrate and a light-emitting element over the support substrate, and the light-emitting element may include a first electrode on a support substrate side, a second electrode overlapping with the first electrode, and an EL layer between the first electrode and the second electrode. In that case, the support substrate may be a flexible substrate, and the light-emitting panel may have a curved surface.

In the above light-emitting device, the constant current supply may further include an AC-DC converter configured to supply a direct current and a DC-DC converter configured to be supplied with the direct current and configured to supply a constant current.

Note that in this specification, the AC-DC converter refers to a device which converts an alternating current into a direct current, and the DC-DC converter refers to a device which converts a voltage of a direct current from one level to another. The constant current power source may include the DC-DC converter as well as a current sensor.

The above light-emitting device may include a battery for supplying a first voltage, a first DC-DC converter configured to be supplied with the first voltage and configured to supply a second voltage higher than the first voltage, a capacitor configured to be supplied with the second voltage, and a second DC-DC converter configured to be supplied with a charge from the capacitor and configured to supply a constant current.

Electronic devices, such as a camera and a digital still camera, including the light-emitting device with the above structure are embodiments of the present invention.

One embodiment of the present invention provides a light-emitting device whose amount of light can be adjusted, a highly reliable light-emitting device, a light-emitting device with low power consumption, or a light-emitting device which is less likely to produce a shadow. One embodiment of the present invention achieves a reduction in size and/or weight of a light-emitting device.

BRIEF DESCRIPTION OF THE DRAWINGS

FIGS. 3A and 3B illustrate a light-emitting panel.

FIGS. 5A and 5B illustrate light-emitting panels.

DETAILED DESCRIPTION OF THE INVENTION

Figure 1A:
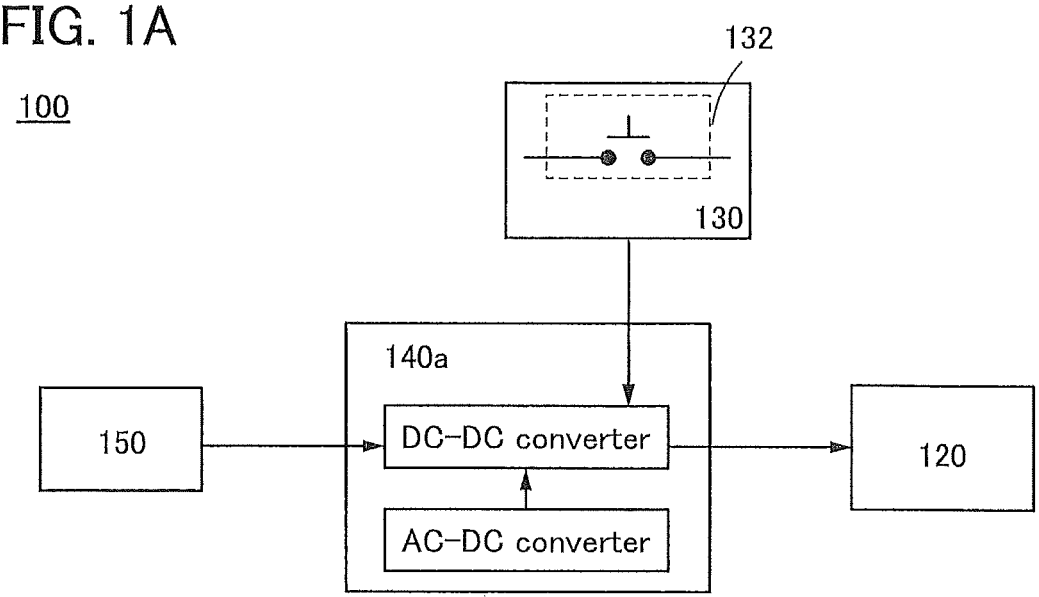
FIGS. 1A to 1D are block diagrams and timing charts for illustrating light-emitting devices.

Embodiments will be described in detail with reference to the drawings. Note that the present invention is not limited to the following description, and it will be easily understood by those skilled in the art that various changes and modifications can be made without departing from the spirit and scope of the present invention. Therefore, the present invention should not be construed as being limited to the description in the following embodiments. Note that in the structures of the invention described below, the same portions or portions having similar functions are denoted by the same reference numerals in different drawings, and description of such portions is not repeated.

Embodiment 1

In this embodiment, configurations of light-emitting devices of one embodiment of the present invention will be described with reference to FIGS. 1A to 1D and FIGS. 2A to 2C.

In the light-emitting device of one embodiment of the present invention, the amount of light emitted from a light-emitting panel can be adjusted by a control signal supplied by a control device. The amount of light may be adjusted manually by a user of the light-emitting device or automatically by the light-emitting device in accordance with the brightness around the light-emitting device detected by an optical sensor, a distance from the light-emitting device to an object (e.g., a subject for photography) detected by a distance sensor, and the like. In a control device capable of arithmetic processing, an arithmetic operation may be performed using the brightness, the distance, an image taken in advance, or the like, and the amount of light may be adjusted in accordance with results of the arithmetic operation.

A light-emitting device of one embodiment of the present invention includes a light-emitting panel that is a surface light source. For example, with the use of an organic EL element, a thin and large-area element can be formed easily. When a surface light source, a point light source, and a line light source emit the same amount of light, the surface light source can have a smaller amount of light per unit area or a shorter emission time than the point light source and the line light source. In addition, the surface light source releases heat easily because of its large light-emitting area. Accordingly, deterioration due to local heat generation of the light-emitting panel can be suppressed. Therefore, the light-emitting device of one embodiment of the present invention has high reliability and its amount of light can be adjusted in a wide range.

Configuration Example 1

A light-emitting device 100 illustrated in FIG. 1A includes a light-emitting panel 120, a driver circuit 130, a constant current supply 140a, and a control device 150. FIG. 1D illustrates an example of a change over time of the current supplied by the DC-DC converter. For example, a current of 2 A can be supplied to the light-emitting panel 120 for 50 milliseconds.

A control signal and a control pulse signal are supplied to the constant current supply 140a. The constant current supply 140a can supply a constant current pulse to the light-emitting panel 120.

The control device 150 can supply a control signal. The control signal is a signal for controlling the magnitude of a constant current pulse. By changing the magnitude of a constant current pulse, the amount of light emitted from the light-emitting panel 120 can be adjusted.

For example, in the case where the control device 150 is supplied with a signal corresponding to the amount of light that is selected by a user of the light-emitting device, the control device 150 may supply a control signal in accordance with the signal. In the case where the control device 150 is supplied with a detection signal from a variety of sensors, the control device 150 may supply a control signal in accordance with the detection signal. In the case where the control device 150 includes an arithmetic unit, the control device 150 may perform an arithmetic operation using a signal supplied to the control device 150 and supply a control signal in accordance with the result of the arithmetic operation.

The driver circuit 130 includes a start switch 132 and can supply a control pulse signal. The driver circuit 130 supplies a control pulse signal in accordance with switching operation of the start switch 132. For example, the driver circuit 130 supplies a control pulse signal so that the constant current supply 140a supplies a constant current with a half width of more than or equal to 1 millisecond and less than or equal to 1000 milliseconds. Since the control pulse signal is supplied by the driver circuit 130 to the constant current supply 140a, the constant current supply 140a can supply a pulsed constant current to the light-emitting panel 120.

<<Light-Emitting Panel>>

The light-emitting panel 120 is a surface light source, and includes a support substrate and a light-emitting element over the support substrate. The number of light-emitting elements may be one or more. The magnitude of constant current pulses supplied to a plurality of light-emitting elements may be controlled by one control signal or may be separately controlled by respective control signals.

As the light-emitting element, for example, an organic EL element can be used. The organic EL element includes a first electrode on the support substrate side, a second electrode overlapping with the first electrode, and an EL layer between the first electrode and the second electrode. Note that the structure of the light-emitting panel 120 is described in detail in Embodiment 2, and the structure of the organic EL element is described in detail in Embodiment 3.

The area of a light-emitting portion of the light-emitting panel 120 is greater than or equal to 0.5 cm$^2$ and less than or equal to 1 m$^2$, preferably greater than or equal to 5 cm$^2$ and less than or equal to 200 cm$^2$, more preferably greater than or equal to 15 cm$^2$ and less than or equal to 100 cm$^2$.

The amount of light of the light-emitting panel 120 can be adjusted within a range where, for example, the current density of a light-emitting element is greater than or equal to 10 mA/cm$^2$ and less than or equal to 1000 mA/cm$^2$, preferably greater than or equal to 10 mA/cm$^2$ and less than or equal to 1500 mA/cm$^2$, more preferably greater than or equal to 10 mA/cm$^2$ and less than 1700 mA/cm$^2$, still more preferably greater than or equal to 1 mA/cm$^2$ and less than or equal to 2000 mA/cm$^2$.

When an organic EL element is used in the light-emitting panel 120, the amount of light per unit area can be small because the area of a light-emitting portion of the light-emitting panel 120 can be easily increased. Thus, the amount of heat generation per unit area can be reduced. Therefore, a light-emitting device which has higher reliability and causes less deterioration of a light-emitting panel than a light-emitting device including a light-emitting diode or the like using an inorganic material.

The light-emitting panel 120 can be thinner and lighter in the case of using an organic EL element than in the case of using a conventional xenon lamp or the like. Heat generated by light emission is diffused over a large area in the light-emitting panel 120 and is therefore released efficiently. Accordingly, heat accumulation in the light-emitting panel 120 is suppressed, and thus, deterioration of the light-emitting panel 120 is suppressed.

Since the light-emitting panel 120 is a surface light source, when the light-emitting device of one embodiment of the present invention is used for a flash of a camera, a shadow is less likely to be produced on a subject for photography.

The light-emitting panel 120 can be configured to emit white light by using a properly selected light-emitting organic compound. For example, a plurality of light-emitting organic compounds which emit light of complementary colors can be used. Alternatively, three kinds of light-emitting organic compounds which emit light of red, green, and blue can be used. Furthermore, different emission spectra can be selected from a variety of organic compounds. Accordingly, the light-emitting device having excellent white balance can be obtained.

By using a light-emitting organic compound, an emission spectrum can be broadened as compared with that of a light-emitting diode using an inorganic material. Light having a broad emission spectrum is close to natural light and suitable for photography.

The light-emitting panel 120 may include a plurality of light-emitting elements exhibiting different colors. If a color or color temperature of a flash of a camera can be changed, the reproducibility of a subject, an environment, an atmosphere, and the like when a photograph is taken can be enhanced. In addition, a light-emitting device may include a plurality of light-emitting panels exhibiting different colors.

A flexible light-emitting panel including a flexible support substrate can be placed along a housing having a curved surface. In that case, a light-emitting device can be placed regardless of the design of a housing. For example, a flash can be placed along a camera housing having a curved surface.

<<Control Device>>

In the case where the control device 150 includes an arithmetic unit, an arithmetic operation can be performed using a signal supplied to the control device 150. The signal supplied to the control device 150 is, for example, a detection signal supplied by a variety of sensors including an optical sensor or a distance sensor, a signal obtained by amplifying the detection signal by an amplifier, or a signal obtained by converting the detection signal or the amplified signal from an analog signal to a digital signal by a converter. The control device 150 may include, for example, a processor such as a central processing unit (CPU) or a digital signal processor (DSP), or a memory such as a RAM or a ROM in which an arithmetic operation program is stored.

<<Constant Current Supply>>

The constant current supply 140a includes an AC-DC converter configured to supply a direct current and a DC-DC converter configured to be supplied with the direct current. The timing of supply of the constant current from the DC-DC converter is controlled by a control pulse signal. Thus, a waveform of a constant current pulse can be shaped.

<<Driver Circuit>>

The driver circuit 130 supplies a control pulse signal with a predetermined width. The predetermined width is, for example, more than or equal to 1 millisecond and less than or equal to 1000 milliseconds, preferably more than or equal to 10 milliseconds and less than or equal to 100 milliseconds.

For example, the driver circuit 130 can be configured using the start switch 132, a latch circuit, and a monostable multivibrator.

Specifically, the start switch 132 is used to supply a high or low signal to the latch circuit. The latch circuit supplies a trigger signal. The monostable multivibrator supplied with the trigger signal supplies a rectangular wave with a predetermined width as the control pulse signal.

Note that in Configuration example 1, the control pulse signal is supplied to the constant current supply 140a and used to control the constant current supply 140a. However, the control pulse signal may be supplied to a switching circuit 110 as described later in Configuration example 2.

Configuration Example 2

Figure 1B:
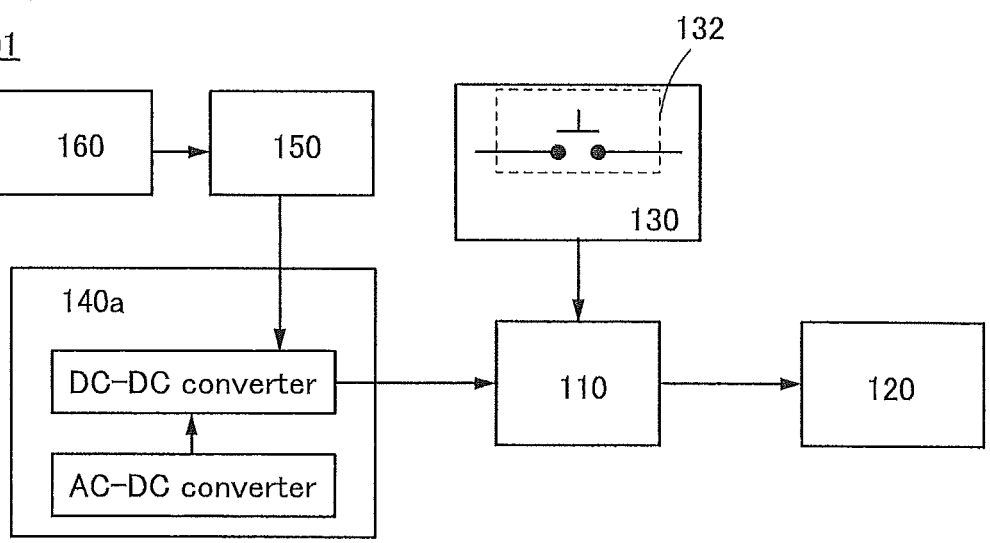

A light-emitting device 101 illustrated in FIG. 1B includes the switching circuit 110, the light-emitting panel 120, the driver circuit 130, the constant current supply 140a, the control device 150, and an optical sensor 160.

A constant current and a control pulse signal are supplied to the switching circuit 110. The switching circuit 110 can supply a constant current pulse. A control signal is supplied to the constant current supply 140a. The constant current supply 140a can supply a constant current. The constant current pulse is supplied to the light-emitting panel 120. The structure of the light-emitting panel 120 in Configuration example 2 can be the same as that in Configuration example 1.

The optical sensor 160 can supply a detection signal to the control device 150 in accordance with the detected amount of light. The control device 150 includes an arithmetic unit. In the arithmetic unit, an arithmetic operation is carried out using the detection signal. The control device 150 can supply a control signal to the constant current supply 140a so that the constant current supply 140a supplies a constant current in accordance with the result of the arithmetic operation. Since the control device 150 supplies a control signal to the constant current supply 140a, the constant current supply 140a can supply a constant current adjusted in accordance with the amount of light detected by the optical sensor 160 to the light-emitting panel 120.

The driver circuit 130 includes a start switch 132 and can supply a control pulse signal. The driver circuit 130 supplies a control pulse signal in accordance with switching operation of the start switch 132. For example, the driver circuit 130 supplies a control pulse signal so that the switching circuit 110 supplies a constant current with a half width of more than or equal to 1 millisecond and less than or equal to 1000 milliseconds. Since the control pulse signal is supplied by the driver circuit 130 to the switching circuit 110, the switching circuit 110 can supply a pulsed constant current to the light-emitting panel 120.

Thus, the light-emitting device 101 can adjust the amount of light emitted from the light-emitting panel 120, in accordance with the amount of light detected by the optical sensor 160. For example, the optical sensor 160 detects the surrounding brightness and the control device 150 carries out an arithmetic operation, whereby current supplied to the light-emitting panel 120 can be adjusted so that the light-emitting panel emits an optimum amount of light.

For example, in the case where the light-emitting device 101 is used for a flash of a camera, the amount of light emitted from the light-emitting device 101 may be controlled to become smaller the larger the amount of light detected by the optical sensor 160 is (the brighter the surroundings of a subject for photography are). Thus, blown-out highlights or blocked up shadows of a photograph can be prevented.

In the case where the light-emitting device 101 is used for a light of a vehicle or a bicycle, the light-emitting device 101 may be controlled to emit light when the amount of light detected by the optical sensor 160 is smaller than or equal to a predetermined value. Furthermore, the amount of light emitted from the light-emitting device 101 may be controlled to become smaller the smaller the detected amount is (the darker the surroundings are and the more easily light emitted from the light-emitting device 101 is perceived). Thus, emission of excessive light can be prevented, so that power saving and a long lifetime of the light-emitting device can be achieved.

<<Optical Sensor>>

The optical sensor 160 includes a photoelectric conversion element such as a photodiode. The optical sensor 160 supplies a detection signal in accordance with the detected amount of light to the control device 150.

<<Switching Circuit>>

The switching circuit 110 supplies the constant current pulse to the light-emitting panel 120 while being supplied with the constant current and the control pulse signal.

For example, the switching circuit 110 may include a power transistor or a power FET. Specifically, the switching circuit 110 can be configured such that the control pulse signal is supplied to a gate of the power transistor, the constant current is supplied to a first electrode of the power transistor, and the light-emitting panel 120 is electrically connected to a second electrode of the power transistor.

Figure 1C:
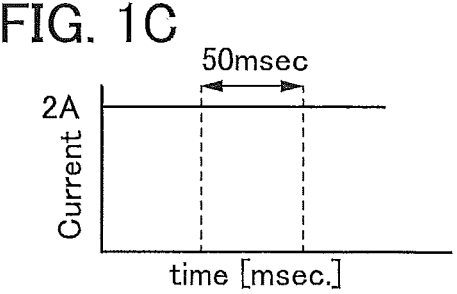
Figure 1D:
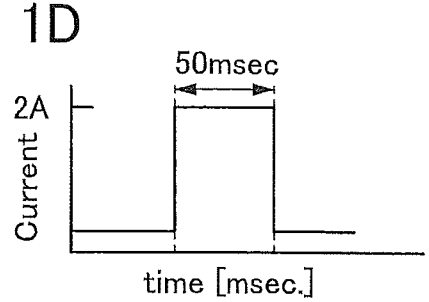

FIG. 1C illustrates an example of a constant current supplied by the DC-DC converter in the light-emitting device 101 illustrated in FIG. 1B. FIG. 1D illustrates an example of a change over time of the current supplied by the switching circuit 110. For example, a current of 2 A can be supplied to the light-emitting panel 120 for 50 milliseconds.

Configuration Example 3

Figure 2A:
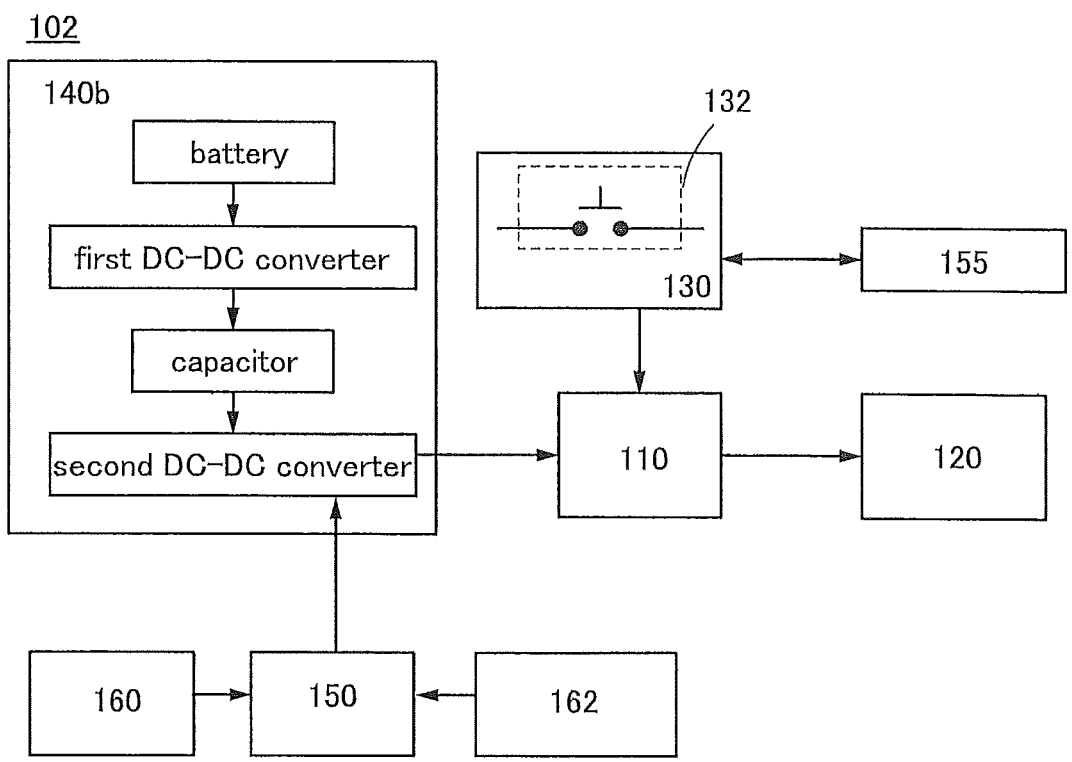
FIGS. 2A to 2C are a block diagram and timing charts for illustrating a light-emitting device.

A light-emitting device 102 illustrated in FIG. 2A is different from the light-emitting device 101 illustrated in FIG. 1B in the structure of the constant current supply and in that the light-emitting device 102 includes a distance sensor 162 and a counter circuit 155. Note that the description in Configuration example 2 is referred to for the other components of the light-emitting device 102 because they are the same as in the light-emitting device 101.

<<Distance Sensor>>

The distance sensor 162 supplies a detection signal in accordance with a measured distance to the control device 150. As the distance sensor 162, a variety of sensors such as an ultrasonic distance sensor or a laser distance sensor can be used.

The control device 150 carries out an arithmetic operation using a detection signal supplied by the optical sensor and a detection signal supplied by the distance sensor. The control device 150 supplies a control signal to a constant current supply 140b so that the constant current supply 140b supplies a constant current in accordance with the result of the arithmetic operation. Since the control device 150 supplies a control signal to the constant current supply 140b, the constant current supply 140b can supply, to the switching circuit 110, a constant current adjusted in accordance with the amount of light detected by the optical sensor 160 or the distance measured by the distance sensor 162.

Thus, the light-emitting device 102 can adjust the amount of light emitted from the light-emitting panel 120 in accordance with the amount of light detected by the optical sensor 160 or the distance measured by the distance sensor 162. For example, in the case where the light-emitting device 102 is used for a flash of a camera, the optical, sensor 160 detects the brightness of the surroundings of a subject, the distance sensor 162 measures the distance from the subject to the camera, and the control device 150 carries out an arithmetic operation, whereby current supplied to the light-emitting panel 120 can be adjusted so that the light-emitting panel emits an optimum amount of light. Thus, blown-out highlights or blocked up shadows of a photograph can be prevented. In addition, emission of unnecessary light can be prevented, so that power saving and a long lifetime of the light-emitting device can be achieved.

<<Modification Example of Constant Current Supply>>

The constant current supply 140b includes a battery for supplying a first voltage, a first DC-DC converter configured to be supplied with the first voltage and configured to supply a second voltage higher than the first voltage, a capacitor supplied with the second voltage, and a second DC-DC converter supplied with a charge from the capacitor.

The first DC-DC converter steps up the voltage (the first voltage) of the battery to the second voltage and supplies the second voltage.

The capacitor is charged with the second voltage.

The second DC-DC converter is supplied with the charge stored in the capacitor and supplies the constant current.

With this configuration, the second DC-DC converter can supply the constant current while the capacitor is supplying the charge to the second DC-DC converter. Note that when the charge stored in the capacitor is less than a predetermined level, the second DC-DC converter cannot supply the constant current.

Figure 2B:
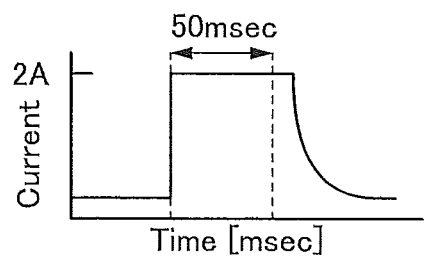

An example of a change over time of the current supplied by the constant current supply 140b is illustrated in FIG. 2B.

Figure 2C:
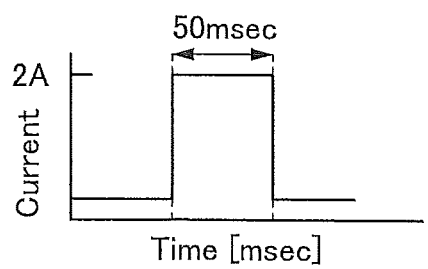

The constant current supply 140b can supply the constant current for a period at least longer than the width of the control pulse signal (e.g., 50 milliseconds) supplied by the driver circuit 130. When the current flows through the switching circuit 110, the charge stored in the capacitor is consumed; eventually, it becomes impossible for the constant current supply 140b to supply the constant current. As a result, a current that is not a rectangular wave flows to the light-emitting panel 120, whereby the light-emitting panel 120 emits light at a useless luminance lower than a predetermined luminance and consumes unnecessary power. The switching circuit 110 can prevent such unnecessary power consumption by stopping the supply of current after the supply of current for a predetermined time. Note that an example of a change over time of the current supplied by the switching circuit 110 is illustrated in FIG. 2C.

In this manner, the constant current supply 140b can supply the constant current by using the battery. Accordingly, the light-emitting device 102 which can be easily carried around can be provided.

<<Counter Circuit>>

A counter circuit 155 counts the number of times the driver circuit 130 supplies the control pulse signal. Thus, the number of times the light-emitting panel 120 has emitted light can be known.

The luminance of the light-emitting panel 120 may be decreased depending on the number of times the light-emitting panel 120 has emitted light.

The number of times counted by the counter circuit 155 may be fed back to the driver circuit 130 and the width of the control pulse signal may be increased. Thus, the emission time of the light-emitting panel 120 can be prolonged and the decrease in the luminance of the light-emitting panel 120 can be compensated for.

Alternatively, the number of times counted by the counter circuit 155 may be fed back to the constant current supply 140b and the amount of the constant current supplied by the constant current supply 140b may be increased. Thus, the decrease in the luminance of the light-emitting panel 120 can be compensated for.

One embodiment of the present invention is applied to a light-emitting device in the above manner, so that the amount of light emitted from the light-emitting device can be adjusted by controlling a current value. Since the light-emitting device includes a light-emitting, panel that is a surface light source, the light-emitting device is less likely to produce a shadow when used as a flash. A light-emitting panel of the light-emitting device is less likely to deteriorate when it emits a large amount of light as compared with the case of using a light-emitting diode using an inorganic material. Thus, the light-emitting device can have high reliability. The light-emitting device can be small and thin as compared with the case of using a xenon lamp or the like.

This embodiment can be combined with any of the other embodiments in this specification as appropriate.

Embodiment 2

In this embodiment, a structure of a light-emitting panel that can be used for the light-emitting device of one embodiment of the present invention will be described with reference to FIGS. 3A and 3B, FIGS. 4A and 4B, and FIGS. 5A and 5B.

<<Configuration Example 1 of Light-Emitting Panel>>

FIG. 3A is a plan view illustrating a light-emitting panel of one embodiment of the present invention, and FIG. 3B is a cross-sectional view taken along dashed-dotted line A-B in FIG. 3A.

In the light-emitting panel illustrated in FIGS. 3A and 3B, the light-emitting element 403 is provided in a space 415 surrounded by the support substrate 401, a sealing substrate 405, and a sealant 407. The light-emitting element 403 is an organic EL element having a bottom-emission structure; specifically, the first electrode 421 which transmits visible light is provided over the support substrate 401, the EL layer 423 is provided over the first electrode 421, and the second electrode 425 which reflects visible light is provided over the EL layer 423.

The structure of the light-emitting element used in one embodiment of the present invention is not limited to the bottom-emission structure and may be a top-emission structure, for example.

A first terminal 409a is electrically connected to an auxiliary wiring 417 and the first electrode 421. An insulating layer 419 is provided over the first electrode 421 in a region which overlaps with the auxiliary wiring 417. The first terminal 409a is electrically insulated from the second electrode 425 by the insulating layer 419. A second terminal 409b is electrically connected to the second electrode 425. Note that although the first electrode 421 is formed over the auxiliary wiring 417 in this embodiment, the auxiliary wiring 417 may be formed over the first electrode 421.

A light extraction structure 411a is preferably provided at the interface between the support substrate 401 and the atmosphere. When provided at the interface between the support substrate 401 and the atmosphere, the light extraction structure 411a can reduce light which cannot be extracted to the atmosphere due to total reflection, resulting in increased light extraction efficiency of the light-emitting panel.

In addition, a light extraction structure 411b is preferably provided between the light-emitting element 403 and the support substrate 401. When the light extraction structure 411b has unevenness, a planarization layer 413 is preferably provided between the light extraction structure 411b and the first electrode 421. Accordingly, the first electrode 421 can be a flat film, and generation of leakage current in the EL layer 423 due to the unevenness of the first electrode 421 can be prevented. Further, because of the light extraction structure 411b at the interface between the planarization layer 413 and the support substrate 401, light which cannot be extracted to the atmosphere due to total reflection can be reduced, so that the light extraction efficiency of the light-emitting panel can be increased.

As a material of the light extraction structure 411a and the light extraction structure 411b, a resin can be used, for example. Alternatively, for the light extraction structure 411a and the light extraction structure 411b, a hemispherical lens, a micro lens array, a film provided with an uneven surface structure, a light diffusing film, or the like can be used. For example, the light extraction structure 411a and the light extraction structure 411b can be formed by attaching the lens or the film to the support substrate 401 with an adhesive or the like which has substantially the same refractive index as the support substrate 401 or the lens or the film.

The surface of the planarization layer 413 which is in contact with the first electrode 421 is flatter than the surface of the planarization layer 413 which is in contact with the light extraction structure 411b. As a material of the planarization layer 413, a material with a light-transmitting property and a high refractive index (e.g., glass, a resin, or a liquid substance such as a refractive index liquid) can be used.

Note that the light-emitting panel of one embodiment of the present invention is not necessarily provided with any light extraction structure. In that case, the second electrode which reflects visible light can be used as a mirror, which is preferable.

<<Configuration Example 2 of Light-Emitting Panel>>

Figure 4B:
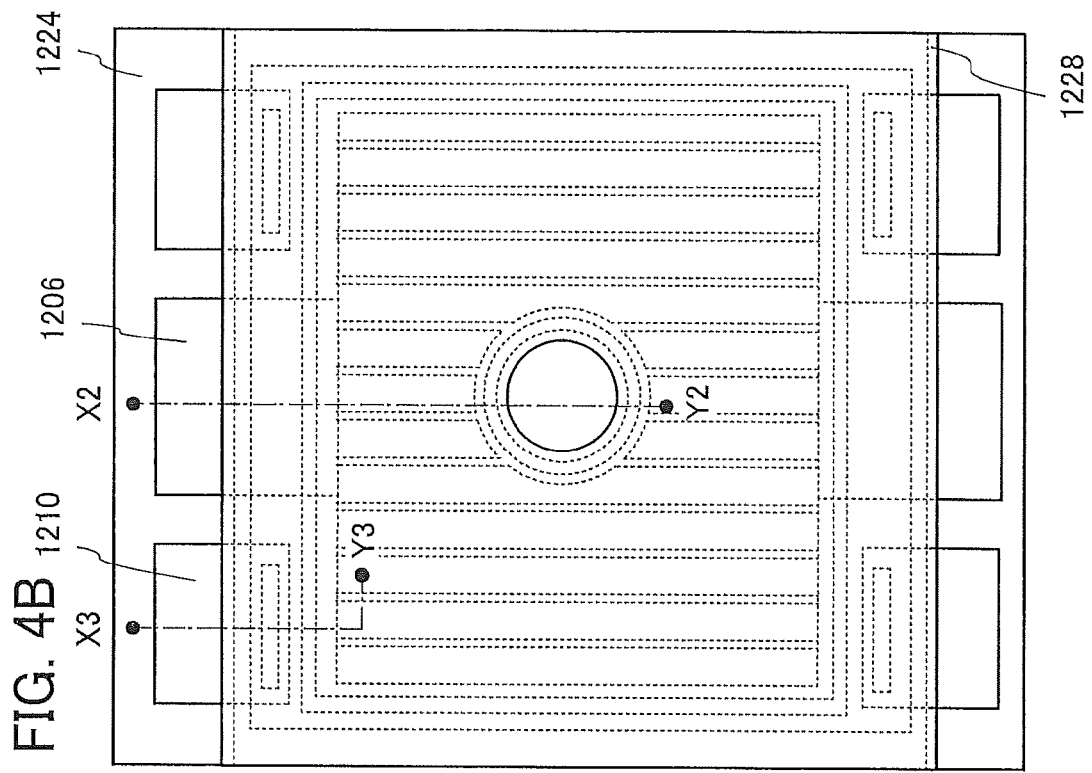
FIGS. 4A and 4B illustrate light-emitting panels.
Figure 4A:
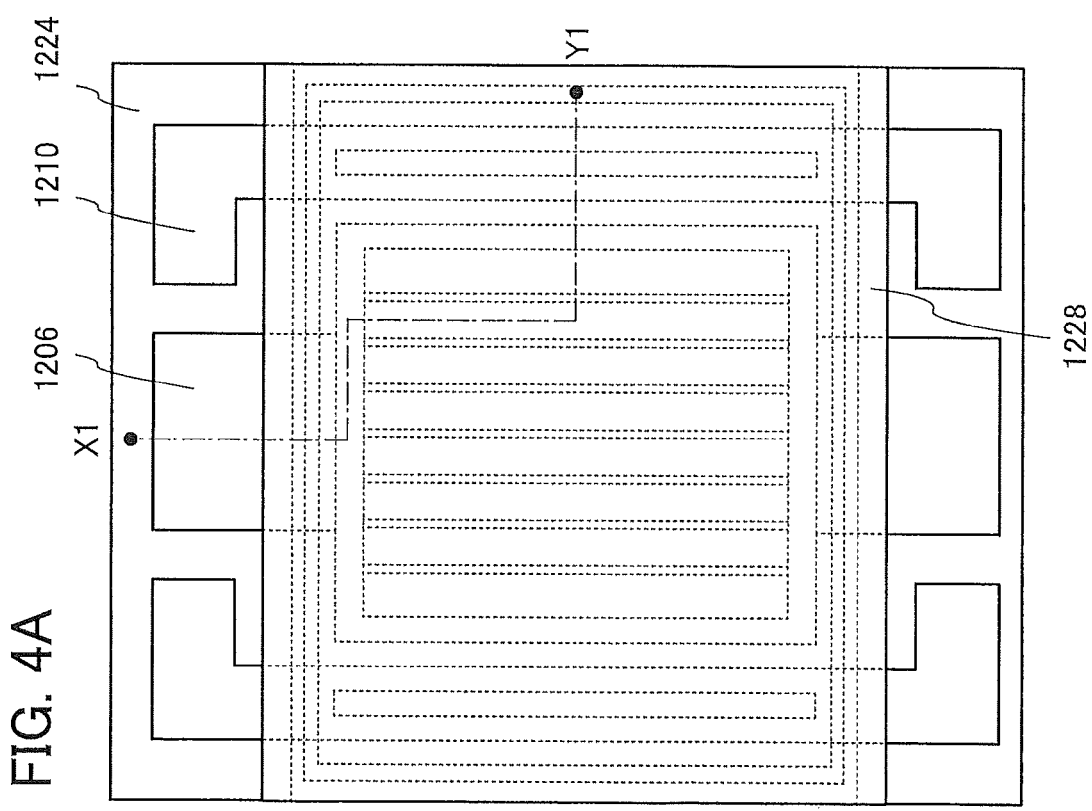

FIG. 4A is a plan view illustrating a light-emitting panel of one embodiment of the present invention, and FIGS. 5A and 5B are each a cross-sectional view taken along dashed-dotted line X1-Y1 in FIG. 4A.

In the light-emitting panel illustrated in FIG. 5A, a light-emitting element 1250 is provided over a support substrate 1220 with an insulating film 1224 provided therebetween. An auxiliary wiring 1206 is provided over the insulating film 1224 and is electrically connected to a first electrode 1201. The auxiliary wiring 1206 is partly exposed and functions as a terminal. An end portion of the first electrode 1201 and an end portion of a conductive layer 1210 are covered with a partition wall 1205. Further, the partition wall 1205 is provided to cover the auxiliary wiring 1206 with the first electrode 1201 provided therebetween. The light-emitting element 1250 is sealed with the support substrate 1220, a sealing substrate 1228, and a sealant 1227. A light extraction structure 1209 is attached to the surface of the support substrate 1220. A flexible light-emitting panel can be obtained by using flexible substrates as the support substrate 1220 and the sealing substrate 1228.

The light-emitting element 1250 is an organic EL element having a bottom-emission structure; specifically, the first electrode 1201 which transmits visible light is provided over the support substrate 1220, an EL layer 1202 is provided over the first electrode 1201, and a second electrode 1203 which reflects visible light is provided over the EL layer 1202.

In the light-emitting panel illustrated in FIG. 5B, a support substrate 1229 having a light extraction structure is provided instead of the support substrate 1220 and the light extraction structure 1209 of the light-emitting panel illustrated in FIG. 5A. The support substrate 1229 has both a function as a support and a function of improving the light extraction efficiency of the light-emitting panel.

As methods for forming a light-emitting element over a flexible substrate in the case of manufacturing a flexible light-emitting panel, there are methods such as a first method in which the light-emitting element is directly formed over a flexible substrate, and a second method in which the light-emitting element is formed over a highly heat-resistant substrate (hereinafter referred to as a formation substrate) which is different from a flexible substrate and the light-emitting element is then separated from the formation substrate and transferred to the flexible substrate.

In the case of using a substrate that is resistant to heat applied in the process of forming the light-emitting element, such as a glass substrate thin enough to have flexibility, the first method is preferably used because the process can be simplified.

When the second method is used, an insulating film with low water permeability or the like which is formed over a formation substrate at high temperature can be transferred to a flexible substrate. Therefore, even when an organic resin with high water permeability and low heat resistance or the like is used as a material of the flexible substrate, a flexible light-emitting panel with high reliability can be manufactured.

<<Configuration Example 3 of Light-Emitting Panel>>

Figure 6A:
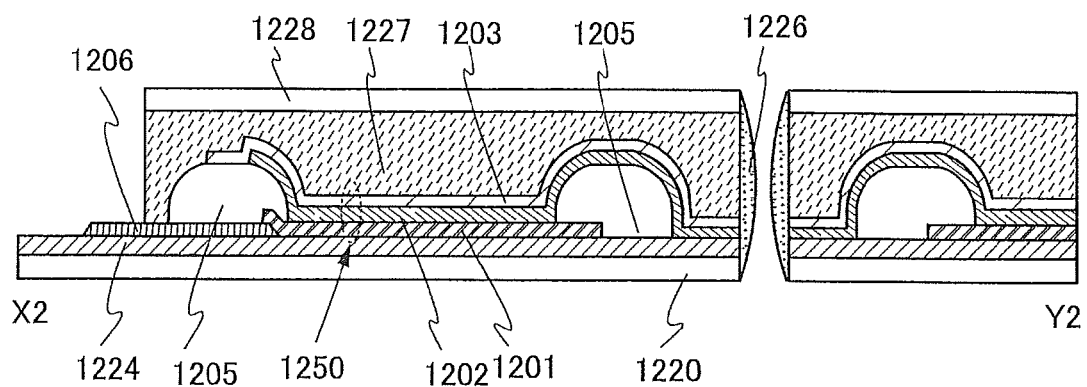
FIGS. 6A to 6C illustrate light-emitting panels.
Figure 6B:
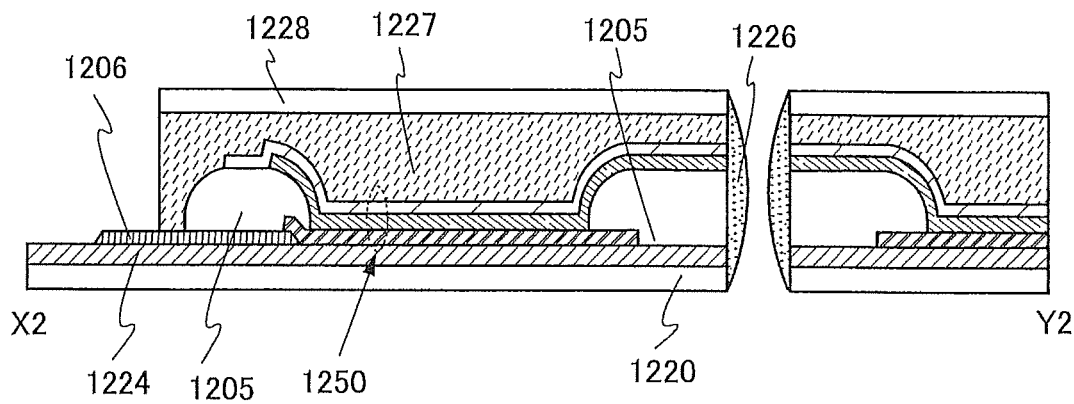
Figure 6C:
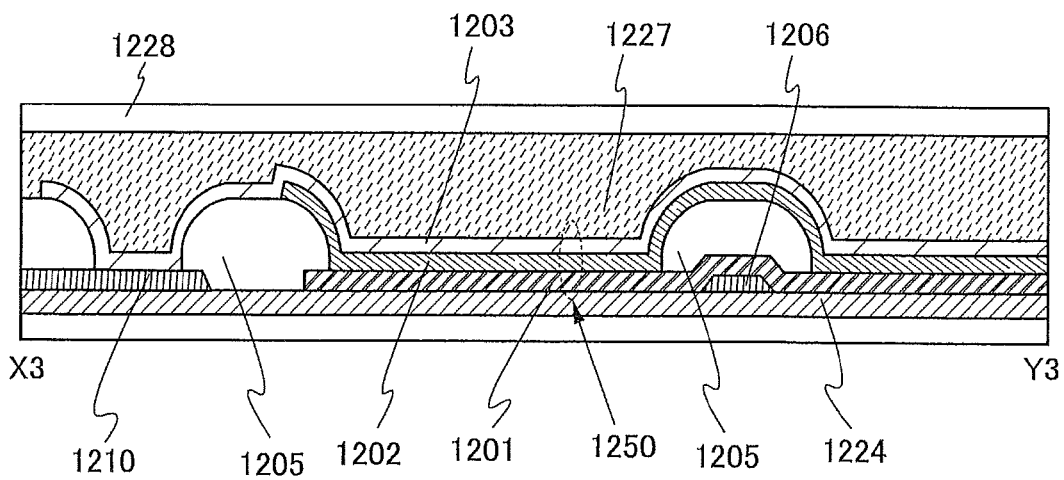

FIG. 4B is a plan view of a light-emitting panel of one embodiment of the present invention. FIGS. 6A and 6B are cross-sectional views taken along the dashed-dotted line X2-Y2 in FIG. 4B, which illustrate examples of cross-sectional structures. FIG. 6C is a cross-sectional view taken along the dashed-dotted line X3-Y3 in FIG. 4B.

The light-emitting panel illustrated in FIGS. 6A to 6C is different from the light-emitting panel described in Configuration example 2 in that the light-emitting panel illustrated in FIGS. 6A to 6C includes an opening. Here, only different components are described in detail, and the description of the light-emitting panel of Configuration example 2 is referred to for the common components.

As illustrated in FIGS. 6A and 6B, the light-emitting panel preferably includes a sealant 1226 in the opening to prevent an electrode or an EL layer from being exposed. Specifically, an opening is formed in the light-emitting panel, and then the sealant 1226 is formed to at least cover an exposed electrode and an exposed EL layer. The sealant 1226 may be the same material as or a different material from the sealant 1227.

FIG. 6A illustrates an example of an opening formed in a region where the partition wall 1205 is not provided. FIG. 6B illustrates an example of an opening formed in a region where the partition wall 1205 is provided.

A light-emitting panel is manufactured in the above manner, and a camera lens is provided to overlap with the opening, whereby a light-emitting portion can be provided around the camera lens. The light-emitting portion can be used as a flash of a camera.

Note that a light extraction structure may be provided on a surface of the substrate.

<<Materials of Light-Emitting Panel>>

Examples of materials that can be used for the light-emitting panel of one embodiment of the present invention are described.

[Substrate]

The substrate through which light emitted from the light-emitting element is extracted is formed using a material that transmits the light. For example, a material such as glass, quartz, ceramics, sapphire, or an organic resin can be used.

The weight and thickness of the light-emitting panel can be decreased by using a thin substrate. Furthermore, a flexible light-emitting panel can be obtained by using a substrate that is thin enough to have flexibility. The flexible light-emitting panel can be stored in a folded state when not in use. The flexible light-emitting panel can be used as a lighting device which emits flash light over a large area, as an alternative to a board reflector in a photography studio. Alternatively, a foldable lighting device can be provided.

Examples of glass include alkali-free glass, barium borosilicate glass, aluminoborosilicate glass, and the like.

Examples of materials having flexibility and a light-transmitting property with respect to visible light include glass that is thin enough to have flexibility, polyester resins such as polyethylene terephthalate (PET) and polyethylene naphthalate (PEN), a polyacrylonitrile resin, a polyimide resin, a polymethyl methacrylate resin, a polycarbonate (PC) resin, a polyethersulfone (PES) resin, a polyamide resin, a cycloolefin resin, a polystyrene resin, a polyamide imide resin, and a polyvinyl chloride resin. In particular, a material whose thermal expansion coefficient is low is preferred, and for example, a polyamide imide resin, a polyimide resin, or PET can be suitably used. A substrate in which a glass fiber is impregnated with an organic resin or a substrate whose thermal expansion coefficient is reduced by mixing an organic resin with an inorganic filler can also be used. A substrate using such a material is lightweight, and thus a light-emitting panel using this substrate can also be lightweight.

Since the substrate through which light is not extracted does not need a light-transmitting property, a metal substrate using a metal material or an alloy material or the like can be used as well as the above-mentioned substrates. A metal material and an alloy material, which have high thermal conductivity, are preferred because they can easily conduct heat to the whole substrate and accordingly can prevent a local temperature rise in the light-emitting panel. To obtain flexibility or bendability, the thickness of a metal substrate is preferably greater than or equal to 10 μm and less than or equal to 200 μm, more preferably greater than or equal to 20 μm and less than or equal to 50 μm.

Although there is no particular limitation on a material of the metal substrate, it is preferable to use, for example, aluminum, copper, nickel, a metal alloy such as an aluminum alloy or stainless steel.

It is possible to use a substrate subjected to insulation treatment in such a manner that a surface of a conductive substrate is oxidized or an insulating film is formed on the surface. An insulating film may be formed by, for example, a coating method such as a spin-coating method or a dipping method, an electrodeposition method, an evaporation method, or a sputtering method. An oxide film may be formed on the substrate surface by exposure to or heating in an oxygen atmosphere or by an anodic oxidation method or the like.

The flexible substrate may have a stacked structure of a layer of any of the above-mentioned materials and a hard coat layer (e.g., a silicon nitride layer) which protects a surface of the light-emitting panel from damage or the like, a layer (e.g., an aramid resin layer) which can disperse pressure, or the like. Furthermore, to suppress a decrease in the lifetime of the light-emitting element due to moisture and the like, an insulating film with low water permeability may be provided. For example, a film containing nitrogen and silicon (e.g., a silicon nitride film, a silicon oxynitride film) or a film containing nitrogen and aluminum (e.g., an aluminum nitride film) may be provided.

The substrate may be formed by stacking a plurality of layers. When a glass layer is used, a barrier property against water and oxygen can be improved and thus a reliable light-emitting panel can be provided.

A substrate in which a glass layer, an adhesive layer, and an organic resin layer are stacked from the side closer to a light-emitting element can be used. The thickness of the glass layer is greater than or equal to 20 μm and less than or equal to 200 μm, preferably greater than or equal to 25 μm and less than or equal to 100 μm. With such a thickness, the glass layer can have both a high barrier property against water and oxygen and a flexibility. The thickness of the organic resin layer is greater than or equal to 10 μm and less than or equal to 200 μm, preferably greater than or equal to 20 μm and less than or equal to 50 μm. With such an organic resin layer provided on an outer side of the glass layer, breakage or a crack of the glass layer can be inhibited, resulting in increased mechanical strength. With the substrate that includes such a composite material of a glass material and an organic resin, a highly reliable and flexible light-emitting panel can be provided.

[Insulating Film]

An insulating film may be provided between the support substrate and the light-emitting element. As the insulating film, an inorganic insulating film such as a silicon oxide film, a silicon nitride film, a silicon oxynitride film, or a silicon nitride oxide film can be used. In order to suppress the entry of moisture or the like into the light-emitting element, an insulating film with low water permeability such as a silicon oxide film, a silicon nitride film, or an aluminum oxide film is particularly preferable. For a similar purpose and with a similar material, an insulating film covering the light-emitting element may be provided.

[Partition Wall]

For the partition wall, an organic resin or an inorganic insulating material can be used. As the organic resin, for example, a polyimide resin, a polyamide resin, an acrylic resin, a siloxane resin, an epoxy resin, or a phenol resin can be used. As the inorganic insulating material, silicon oxide, silicon oxynitride, or the like can be used. In particular, a photosensitive resin is preferably used for easy formation of the partition wall.

There is no particular limitation on the method for forming the partition wall. A photolithography method, a sputtering method, an evaporation method, a droplet discharging method (e.g., an inkjet method), a printing method (e.g., a screen printing method or an offset printing method), or the like can be used.

[Auxiliary Wiring]

The auxiliary wiring is not necessarily provided; however, the auxiliary wiring is preferably provided because voltage drop due to the resistance of an electrode can be prevented.

For the auxiliary wiring, a single layer or a stacked layer using a material selected from copper (Cu), titanium (Ti), tantalum (Ta), tungsten (W), molybdenum (Mo), chromium (Cr), neodymium (Nd), scandium (Sc), or nickel (Ni) or an alloy material including any of these materials as its main component is used. Aluminum can also be used as a material of the auxiliary wiring. In the case where aluminum is in direct contact with a transparent conductive oxide material, aluminum might corrode. For this reason, it is preferable that the auxiliary wiring have a stacked-layer structure in which aluminum be used for a layer that is not in contact with ITO or the like. The thickness of the auxiliary wiring can be greater than or equal to 0.1 µm and less than or equal to 3 µm, preferably greater than or equal to 0.1 µm and less than or equal to 0.5 µm.

[Sealant]

A method for sealing the light-emitting panel is not limited, and either solid sealing or hollow sealing can be employed. For example, a glass material such as a glass frit, or a resin material such as a resin that is curable at room temperature (e.g., a two-component-mixture-type resin), a light curable resin, or a heat-curable resin can be used. The light-emitting panel may be filled with an inert gas such as nitrogen or argon, or resin such as a polyvinyl chloride (PVC) resin, an acrylic resin, a polyimide resin, an epoxy resin, a silicone resin, a polyvinyl butyral (PVB) resin, or an ethylene vinyl acetate (EVA) resin. Further, a drying agent may be contained in the resin.

[Light Extraction Structure]

For the light extraction structure, a hemispherical lens, a micro lens array, a film provided with an uneven surface structure, a light diffusing film, or the like can be used. For example, the light extraction structure can be formed by attaching the lens or film to the substrate with an adhesive or the like which has substantially the same refractive index as the substrate or the lens or film.

This embodiment can be combined with any of the other embodiments in this specification as appropriate.

Embodiment 3

In this embodiment, light-emitting elements which can be used in the light-emitting device of one embodiment of the present invention will be described with reference to FIGS. 7A to 7D.

<Structural Example of Light-Emitting Element>

Figure 7A:
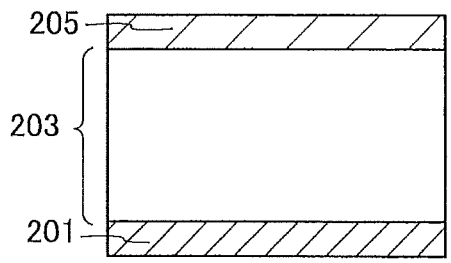
FIGS. 7A to 7D illustrate light-emitting elements.

A light-emitting element illustrated in FIG. 7A includes an EL layer 203 between a first electrode 201 and a second electrode 205. In this embodiment, the first electrode 201 serves as an anode, and the second electrode 205 serves as a cathode.

When a voltage higher than the threshold voltage of the light-emitting element is applied between the first electrode 201 and the second electrode 205, holes are injected to the EL layer 203 from the first electrode 201 side and electrons are injected to the EL layer 203 from the second electrode 205 side. The injected electrons and holes recombine in the EL layer 203 and a light-emitting substance contained in the EL layer 203 emits light.

The EL layer 203 includes at least a light-emitting layer 303 containing a light-emitting substance.

In addition to the light-emitting layer, the EL layer 203 may further include one or more layers containing any of a substance with a high hole-injection property, a substance with a high hole-transport property, a substance with a high electron-transport property, a substance with a high electron-injection property, a substance with a bipolar property (a substance with a high electron-transport property and a high hole-transport property), and the like. For the EL layer 203, either a low molecular compound or a high molecular compound can be used, and an inorganic compound may also be used.

Figure 7B:
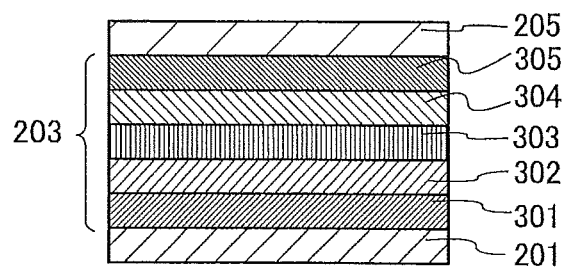

A light-emitting element illustrated in FIG. 7B includes the EL layer 203 between the first electrode 201 and the second electrode 205, and in the EL layer 203, a hole-injection layer 301, a hole-transport layer 302, the light-emitting layer 303, an electron-transport layer 304, and an electron-injection layer 305 are stacked in that order from the first electrode 201 side.

Figure 7C:
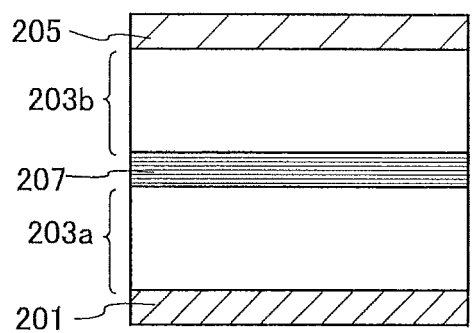
Figure 7D:
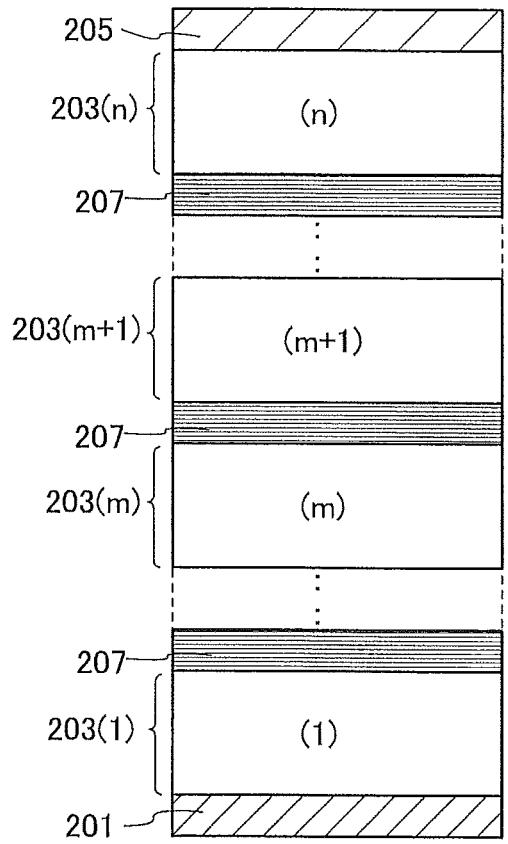

As in light-emitting elements illustrated in FIGS. 7C and 7D, a plurality of EL layers may be stacked between the first electrode 201 and the second electrode 205. In this case, an intermediate layer 207 is preferably provided between the stacked EL layers. The intermediate layer 207 includes at least a charge-generation region.

For example, the light-emitting element illustrated in FIG. 7C includes the intermediate layer 207 between a first EL layer 203a and a second EL layer 203b. The light-emitting element illustrated in FIG. 7D includes n EL layers (n is a natural number of 2 or more), and the intermediate layers 207 between the EL layers.

The following shows behaviors of electrons and holes in the intermediate layer 207 between the EL layer 203($m$) and the EL layer 203($m$+1). When a voltage higher than the threshold voltage of the light-emitting element is applied between the first electrode 201 and the second electrode 205, holes and electrons are generated in the intermediate layer 207, and the holes move into the EL layer 203($m$+1) provided on the second electrode 205 side and the electrons move into the EL layer 203($m$) provided on the first electrode 201 side. The holes injected into the EL layer 203($m$+1) recombine with the electrons injected from the second electrode 205 side, so that a light-emitting substance contained in the EL layer 203($m$+1) emits light. Further, the electrons injected into the EL layer 203($m$) recombine with the holes injected from the first electrode 201 side, so that a light-emitting substance contained in the EL layer 203($m$) emits light. Thus, the holes and electrons generated in the intermediate layer 207 cause light emission in the respective EL layers.

Note that the EL layers can be provided in contact with each other with no intermediate layer provided therebetween when these EL layers allow the same structure as the intermediate layer to be formed therebetween. For example, when the charge-generation region is formed over one surface of an EL layer, another EL layer can be provided in contact with the surface.

Further, when emission colors of EL layers are made different, light emission of a desired color can be provided from the light-emitting element as a whole. For example, in a light-emitting element having two EL layers, when the emission colors of first and second EL layers are complementary, the light-emitting element can emit white light as a whole. This can be applied to a light-emitting element having three or more EL layers.

<<Material of Light-Emitting Element>>

Examples of materials which can be used for the layers are described below. Note that each layer is not limited to a single layer, and may be a stack including two or more layers.

<Anode>

The electrode serving as the anode (the first electrode 201) can be formed using one or more kinds of conductive metals, alloys, conductive compounds, and the like. In particular, it is preferable to use a material with a high work function (4.0 eV or more). Examples include indium tin oxide (ITO), indium tin oxide containing silicon or silicon oxide, indium zinc oxide, indium oxide containing tungsten oxide and zinc oxide, graphene, gold, platinum, nickel, tungsten, chromium, molybdenum, iron, cobalt, copper, palladium, titanium, and a nitride of a metal material (e.g., titanium nitride).

When the anode is in contact with the charge-generation region, any of a variety of conductive materials can be used regardless of their work functions; for example, aluminum, silver, an alloy containing aluminum, or the like can be used.

<Cathode>

The electrode serving as the cathode (the second electrode 205) can be formed using one or more kinds of conductive metals, alloys, conductive compounds, and the like. In particular, it is preferable to use a material with a low work function (3.8 eV or less). Examples include aluminum, silver, an element belonging to Group 1 or 2 of the periodic table (e.g., an alkali metal such as lithium or cesium, an alkaline earth metal such as calcium or strontium, or magnesium), an alloy containing any of these elements (e.g., Mg—Ag or Al—Li), a rare earth metal such as europium or ytterbium, and an alloy containing any of these rare earth metals.

Note that when the cathode is in contact with the charge-generation region, a variety of conductive materials can be used regardless of its work function. For example, ITO, indium tin oxide containing silicon or silicon oxide, or the like can be used.

The electrodes may be formed separately by a vacuum evaporation method or a sputtering method. Alternatively, when a silver paste or the like is used, a coating method or an inkjet method may be used.

<Hole-Injection Layer 301>

The hole-injection layer 301 contains a substance with a high hole-injection property.

Examples of the substance with a high hole-injection property include metal oxides such as molybdenum oxide, vanadium oxide, ruthenium oxide, tungsten oxide, and manganese oxide; and phthalocyanine-based compounds such as phthalocyanine (abbreviation: $H_2Pc$) and copper(II) phthalocyanine (abbreviation: CuPc).

Other examples of the substance with a high hole-injection property include high molecular compounds such as poly(N-vinylcarbazole) (abbreviation: PVK), poly(4-vinyltriphenylamine) (abbreviation: PVTPA); and high molecular compounds to which acid is added such as poly(3,4-ethylenedioxythiophene)/poly(styrenesulfonic acid) (abbreviation: PEDOT/PSS).

The hole-injection layer 301 may serve as the charge-generation region. When the hole-injection layer 301 in contact with the anode serves as the charge-generation region, any of a variety of conductive materials can be used for the anode regardless of their work functions. Materials contained in the charge-generation region will be described later.

<Hole-Transport Layer 302>

The hole-transport layer 302 contains a substance with a high hole-transport property.

The substance with a high hole-transport property is a substance with a property of transporting more holes than electrons, and is especially preferably a substance with a hole mobility of $10^{-6}$ cm$^2$/Vs or more. A variety of compounds can be used. For example, an aromatic amine compound such as 4,4'-bis[N-(1-naphthyl)-N-phenylamino]biphenyl (abbreviation: NPB or α-NPD) or 4-phenyl-4'-(9-phenylfluoren-9-yl)triphenylamine (abbreviation: BPAFLP); a carbazole derivative such as 4,4'-di(N-carbazolyl)biphenyl (abbreviation: CBP), 9-[4-(10-phenyl-9-anthryl)phenyl]-9H-carbazole (abbreviation: CzPA), or 9-phenyl-3-[4-(10-phenyl-9-anthryl)phenyl]-9H-carbazole (abbreviation: PCzPA); an aromatic hydrocarbon compound such as 2-tert-butyl-9,10-di(2-naphthyl)anthracene (abbreviation: t-BuDNA), 9,10-di(2-naphthyl)anthracene (abbreviation: DNA), or 9,10-diphenylanthracene (abbreviation: DPAnth); a high molecular compound such as PVK or PVTPA.

<Light-Emitting Layer 303>

For the light-emitting layer 303, a fluorescent compound which exhibits fluorescence or a phosphorescent compound which exhibits phosphorescence can be used.

Examples of the fluorescent compound that can be used for the light-emitting layer 303 include N,N'-bis[4-(9H-carbazol-9-yl)phenyl]-N,N'-diphenylstilbene-4,4'-diamine (abbreviation: YGA2S), N-(9,10-diphenyl-2-anthryl)-N,9-diphenyl-9H-carbazol-3-amine (abbreviation: 2PCAPA), and rubrene.

Examples of the phosphorescent compound that can be used for the light-emitting layer 303 include organometallic complexes such as bis[2-(4'6'-difluorophenyl)pyridinato-N,C$^{2'}$]iridium(III) picolinate (abbreviation: FIrpic), tris(2-phenylpyridinato-N,C$^{2'}$)iridium(III) (abbreviation: Ir(ppy)$_3$), and (acetylacetonato)bis(3,5-dimethyl-2-phenylpyrazinato)iridium(III) (abbreviation: Ir(mppr-Me)$_2$(acac)).

The light-emitting layer 303 may have a structure in which any of the above-described light-emitting organic compounds (a light-emitting substance or a guest material) is dispersed in another substance (a host material). As the host material, a variety of kinds of materials can be used, and it is preferable to use a substance which has a lowest unoccupied molecular orbital level (LUMO level) higher than that of the guest material and has a highest occupied molecular orbital level (HOMO level) lower than that of the guest material.

With the structure in which the guest material is dispersed in the host material, crystallization of the light-emitting layer 303 can be inhibited. Furthermore, concentration quenching due to high concentration of the guest material can be suppressed.

As the host material, the above-described substance with a high hole-transport property (e.g., an aromatic amine compound or a carbazole derivative) or a later-described substance with a high electron-transport property (e.g., a metal complex having a quinoline skeleton or a benzoquinoline skeleton or a metal complex having an oxazole-based or thiazole-based ligand) can be used. As the host material, specifically, a metal complex such as tris(8-quinolinolato)aluminum(III) (abbreviation: Alq) or bis(2-methyl-8-quinolinolato)(4-phenylphenolato)aluminum(III) (abbreviation: BAlq); a heterocyclic compound such as 3-(4-biphenylyl)-

4-phenyl-5-(4-tert-butylphenyl)-1,2,4-triazole (abbreviation: TAZ), bathophenanthroline (abbreviation: BPhen), or bathocuproine (abbreviation: BCP); a condensed aromatic compound such as CzPA, DNA, t-BuDNA, or DPAnth; or an aromatic amine compound such as NPB can be used.

Alternatively, as the host material, a plurality of kinds of materials can be used. For example, in order to suppress crystallization, a substance such as rubrene that suppresses crystallization may be further added. In addition, NPB, Alq, or the like may be further added in order to transfer energy to the guest material more efficiently.

Further, when a plurality of light-emitting layers are provided and emission colors of the light-emitting layers are made different, light emission of a desired color can be provided from the light-emitting element as a whole. For example, in a light-emitting element having two light-emitting layers, the emission colors of first and second light-emitting layers are complementary, so that the light-emitting element can emit white light as a whole. Further, the same applies to a light-emitting element having three or more light-emitting layers.

<Electron-Transport Layer 304>

The electron-transport layer 304 contains a substance with a high electron-transport property.

The substance with a high electron-transport property is an organic compound having a property of transporting more electrons than holes, and is especially preferably a substance with an electron mobility of $10^{-6}$ cm$^2$/Vs or more.

As the substance with a high electron-transport property, for example, a metal complex having a quinoline skeleton or a benzoquinoline skeleton, such as Alq or BAlq, can be used. Alternatively, a metal complex having an oxazole-based ligand or a thiazole-based ligand, such as bis[2-(2-hydroxyphenyl)benzoxazolato]zinc (abbreviation: Zn(BOX)$_2$) or bis[2-(2-hydroxyphenyl)benzothiazolato]zinc (abbreviation: Zn(BTZ)$_2$) or the like can be used. Alternatively, TAZ, BPhen, BCP, or the like can be used.

<Electron-Injection Layer 305>

The electron-injection layer 305 contains a substance with a high electron-injection property.

Examples of the substance with a high electron-injection property include alkali metals, alkaline earth metals, and compounds thereof, such as lithium, cesium, calcium, lithium fluoride, cesium fluoride, calcium fluoride, and lithium oxide. In addition, a rare earth metal compound such as erbium fluoride can also be used. Furthermore, the substance for the electron-transport layer 304 described above can also be used.

<Charge-Generation Region>

The charge-generation region may have either a structure in which an electron acceptor (acceptor) is added to an organic compound with a high hole-transport property or a structure in which an electron donor (donor) is added to an organic compound with a high electron-transport property. Alternatively, these structures may be stacked.

As examples of an organic compound with a high hole-transport property, the above materials which can be used for the hole-transport layer can be given, and as examples of an organic compound with a high electron-transport property, the above materials which can be used for the electron-transport layer can be given.

Further, as examples of the electron acceptor, 7,7,8,8-tetracyano-2,3,5,6-tetrafluoroquinodimethane (abbreviation: F4-TCNQ), chloranil, and the like can be given. In addition, transition metal oxides can be given. In addition, oxides of metals that belong to Group 4 to Group 8 of the periodic table can be given. Specifically, vanadium oxide, niobium oxide, tantalum oxide, chromium oxide, molybdenum oxide, tungsten oxide, manganese oxide, and rhenium oxide are preferable since their electron-accepting property is high. Among these, molybdenum oxide is especially preferable because it is stable in the air, has a low hygroscopic property, and is easily handled.

Further, as the electron donor, it is possible to use an alkali metal, an alkaline earth metal, a rare earth metal, a metal belonging to Group 13 of the periodic table, or an oxide or a carbonate thereof. Specifically, lithium, cesium, magnesium, calcium, ytterbium, indium, lithium oxide, cesium carbonate, or the like is preferably used. Alternatively, an organic compound such as tetrathianaphthacene may be used as the electron donor.

The above-described layers included in the EL layer 203 and the intermediate layer 207 can be formed by any of the following methods: an evaporation method (including a vacuum evaporation method), a transfer method, a printing method, an inkjet method, a coating method, and the like.

This embodiment can be combined with any of the other embodiments in this specification as appropriate.

Embodiment 4

In this embodiment, electronic devices which include the light-emitting device of one embodiment of the present invention will be described with reference to FIGS. 8A to 8C and FIGS. 9A to 9C.

The light-emitting device of one embodiment of the present invention can be used for a flash of a camera such as a digital still camera, a flash of a camera incorporated in a mobile phone (also called a cell phone or mobile phone device) or a portable information terminal having a photography function, or the like. Alternatively, the light-emitting device of one embodiment of the present invention can be used for a light of a bicycle or a car, a beacon, illuminations for decorative purposes, or the like.

Figure 8A:
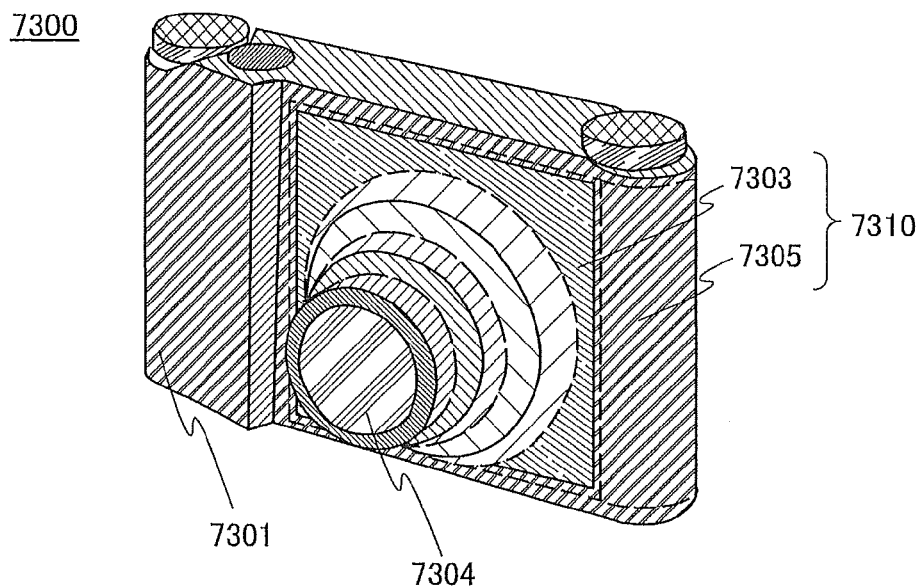
FIGS. 8A to 8C illustrate electronic devices.

FIG. 8A illustrates an example of a digital still camera. A digital still camera 7300 includes a housing 7301, a lens 7304, a light-emitting device 7310, and the like. The light-emitting device of one embodiment of the present invention is applied to the light-emitting device 7310. A light-emitting portion 7303 of the light-emitting device 7310 is located so as to surround the lens 7304. The light-emitting device of one embodiment of the present invention is flexible and can thus be curved. In the digital still camera 7300, a non-light-emitting portion 7305 of the light-emitting device 7310 is bent to fit the shape of the housing 7301, which enables the light-emitting portion 7303 to be located over a large area around the lens 7304. This can make a shadow of a nose less likely to be cast on a cheek when a photograph of a human face is taken in a dark place using a flash, for example. Note that a light-emitting element may be formed in the non-light-emitting portion 7305 through the same process and may be used as an indicator of operating conditions.

Figure 8B:
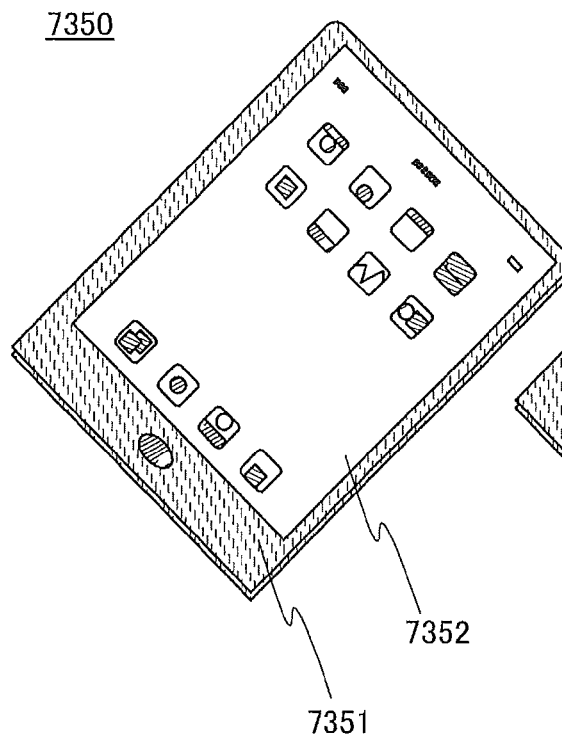
Figure 8C:
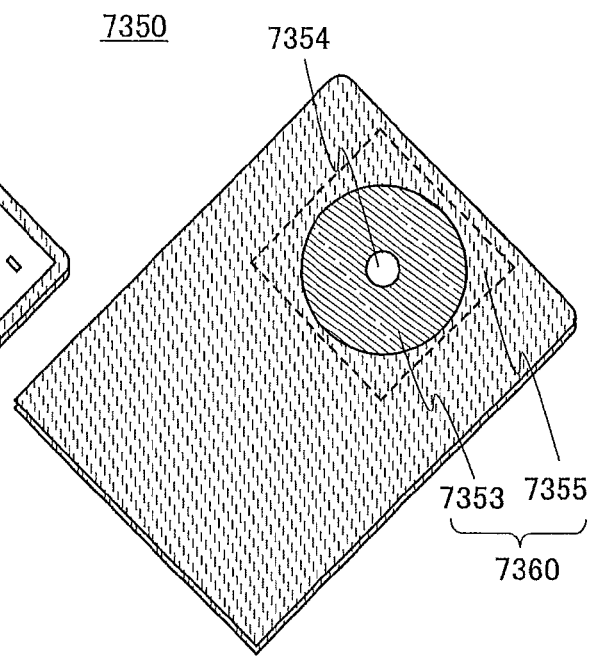

FIGS. 8B and 8C illustrate an example of a mobile phone. One side (also referred to as a front side) of a mobile phone 7350 is illustrated in FIG. 8B, and a side opposite the one side (also referred to as a back side) is illustrated in FIG. 8C.

The mobile phone 7350 includes a housing 7351, a display portion 7352, a lens 7354, a light-emitting device 7360, and the like. The light-emitting device of one embodiment of the present invention is applied to the light-emitting device 7360. The light-emitting device 7360 includes a light-emitting portion 7353 and a non-light-emitting portion 7355, and the light-emitting portion 7353 is located so as to surround the lens 7354. The light-emitting portion 7353 may be used as a mirror when not emitting light.

Figure 9A:
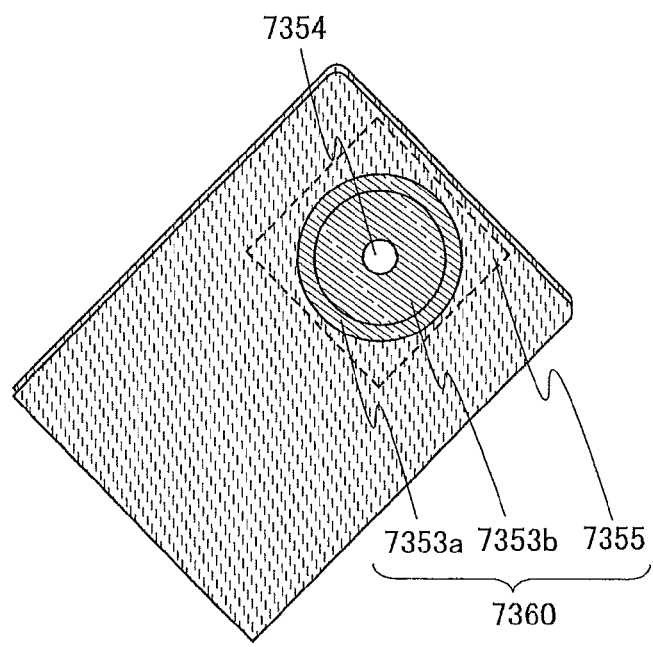
FIGS. 9A to 9C illustrate electronic devices.

FIG. 9A illustrates a modification example of the light-emitting device 7360 of the mobile phone 7350. The light-emitting device 7360 illustrated in FIG. 9A includes two light-emitting panels 7353a and 7353b.

Figure 10:
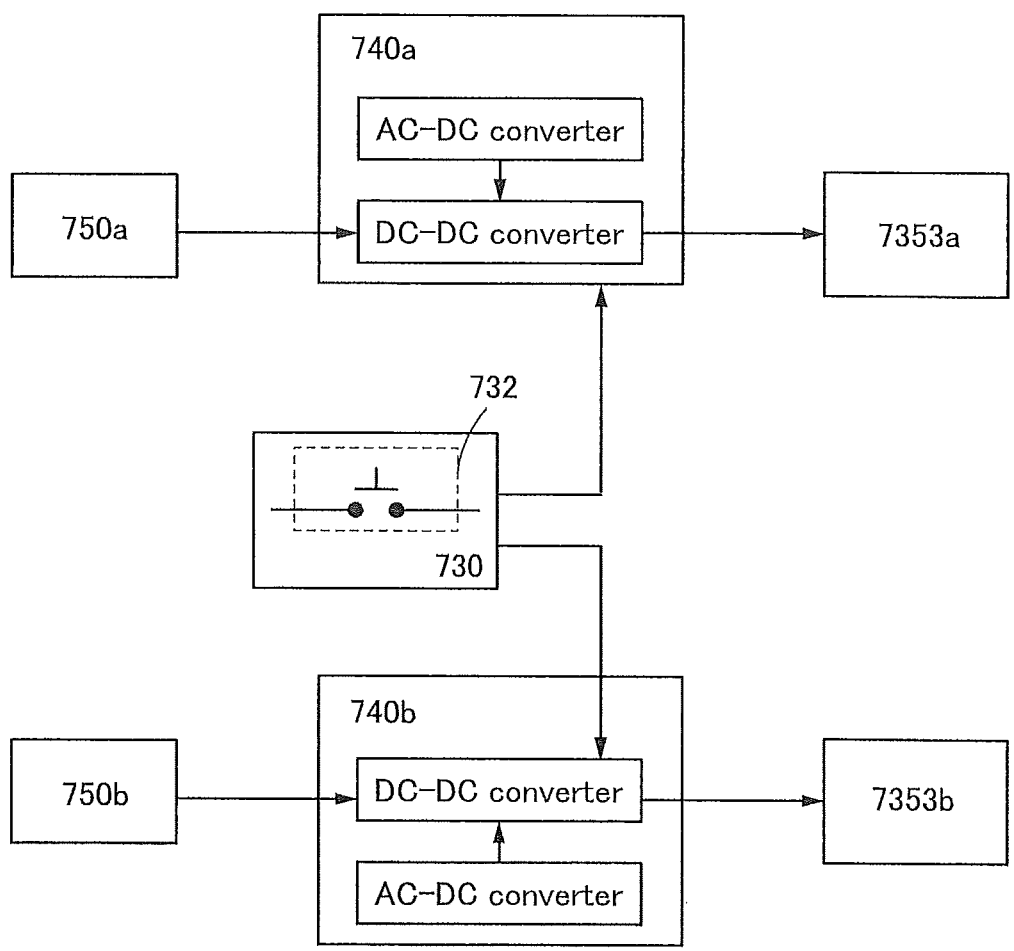
FIG. 10 is a block diagram for illustrating a light-emitting device.

FIG. 10 is a block diagram of the light-emitting device 7360 illustrated in FIG. 9A. The light-emitting device 7360 includes the two light-emitting panels 7353a and 7353b, a driver circuit 730, two constant current supplies 740a and 740b, and two control devices 750a and 750b.

The two control devices 750a and 750b are supplied with a signal corresponding to a condition selected by a user of the mobile phone 7350 or detection signals from a variety of sensors. Each of the control devices 750a and 750b supplies a control signal in accordance with a supplied signal.

The constant current supply 740a supplies a constant current pulse to the light-emitting panel 7353a in accordance with a control signal supplied by the control device 750a. The constant current supply 740b supplies a constant current pulse to the light-emitting panel 7353b in accordance with a control signal supplied by the control device 750b. Thus, the amount of light of the light-emitting panels 7353a and 7353b is separately adjusted. As a result, the amount of light emitted from the light-emitting device can be adjusted in a wider range, which is preferable.

The light-emitting panels 7353a and 7353b may emit light with different colors or different color temperatures. For example, in the case where the two light-emitting panels have different color temperatures, the light-emitting device can emit light with an appropriate color temperature by separately adjusting the amount of light of the light-emitting panels.

The driver circuit 730 includes a start switch 732. The light-emitting panels 7353a and 7353b are separately supplied with a control pulse signal by the driver circuit 730. The driver circuit 730 may supply the same control pulse signals or different control pulse signals to the light-emitting panels 7353a and 7353b.

The light-emitting device 7360 may include two or more driver circuits, and may include three or more light-emitting panels. In addition, the light-emitting device 7360 may include a light-emitting panel whose light amount cannot be adjusted in addition to a light-emitting panel of one embodiment of the present invention in which the amount of light can be adjusted.

In the light-emitting device 7360 having the structure illustrated in FIG. 10, the light-emitting panels 7353a and 7353b can each independently emit light. For example, when one light-emitting panel emits a sufficient amount of light, only one light-emitting panel is made to emit light, and only when a larger amount of light is needed, both light-emitting panels are made to emit light. Thus, power consumption of the light-emitting device can be reduced and deterioration of the light-emitting panels can be suppressed.

Figure 9B:
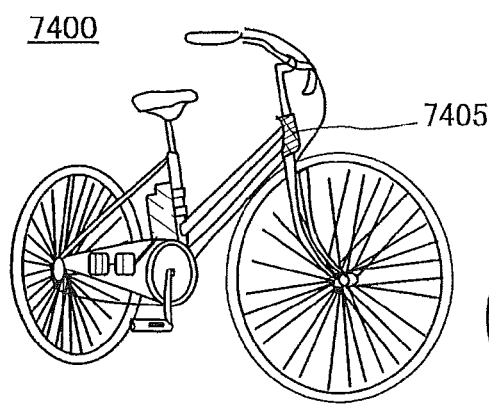

FIG. 9B illustrates an example of a bicycle. A bicycle 7400 includes a light 7405. The light 7405 includes the light-emitting device of one embodiment of the present invention.

Figure 9C:
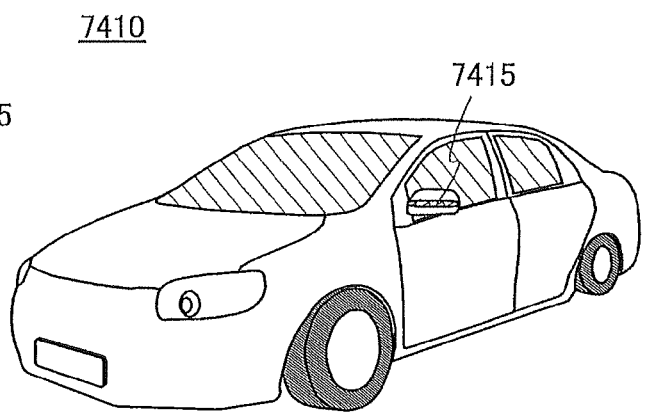

FIG. 9C illustrates an example of a vehicle. A vehicle 7410 includes a light 7415. The light-emitting device of one embodiment of the present invention is applied to the light 7415.

In the case where the light-emitting device of one embodiment of the present invention is used for a light of a bicycle or a vehicle, after detection of the surrounding brightness by an optical sensor, the following controls can be performed, for example: when the surrounding brightness is sufficiently high, the light does not emit light; when the surrounding brightness is sufficiently low, the light blinks; and when the surrounding brightness is not sufficiently high but light is detected, the light blinks and the amount of light emitted from the light is increased. Thus, the light-emitting device of one embodiment of the present invention can emit an optimum amount of light, and a light with low power consumption can be achieved.

This embodiment can be combined with any of the other embodiments in this specification as appropriate.

Example 1

In this example, a light-emitting panel of one embodiment of the present invention will be described.

A plan view of a light-emitting panel manufactured in this example is illustrated in FIG. 4A, and a cross-sectional view taken along dashed-dotted line X1-Y1 in FIG. 4A is illustrated in FIG. 5B. Note that some components of the light-emitting panel are not illustrated in FIG. 4A.

In the light-emitting panel of this example, as illustrated in FIG. 5B, the light-emitting element 1250 is provided over the support substrate 1229 having a light extraction structure, with the insulating film 1224 provided therebetween. The auxiliary wiring 1206 is provided over the insulating film 1224 and is electrically connected to the first electrode 1201. A part of the auxiliary wiring 1206 is exposed to function as a terminal. An end portion of the first electrode 1201 and an end portion of the conductive layer 1210 are covered with the partition wall 1205. Further, the partition wall 1205 is provided to cover the auxiliary wiring 1206 with the first electrode 1201 provided therebetween. The light-emitting element 1250 is sealed with the support substrate 1229, the sealing substrate 1228, and the sealant 1227.

In the light-emitting panel of this example, a diffusion film of a polyester-based resin was used as the support substrate 1229, and a substrate including a thin glass layer and a polyethylene terephthalate (PET) layer was used as the sealing substrate 1228. These substrates are flexible, and the light-emitting panel of this example is a flexible light-emitting panel. The area of a light-emitting region of the light-emitting panel of this example is 56 mm×42 mm.

The light-emitting element 1250 is an organic EL element having a bottom-emission structure; specifically, the first electrode 1201 which transmits visible light is provided over the support substrate 1229, the EL layer 1202 is provided over the first electrode 1201, and the second electrode 1203 which reflects visible light is provided over the EL layer 1202.

A method for manufacturing the light-emitting panel of this example will be described.

First, a base film, a separation layer (a tungsten film), and a layer to be separated were formed in this order over a glass substrate that was a formation substrate. In this example, the layer to be separated includes the insulating film 1224, the auxiliary wiring 1206, the first electrode 1201, and the partition wall 1205.

A total of seven auxiliary wirings 1206 were formed over the insulating film 1224. At this time, the auxiliary wirings 1206 with a width L2 of 322 μm were formed at a pitch of 5.3 mm. As the first electrode 1201, a film of indium tin oxide containing silicon oxide (ITSO) was formed. A total of seven partition walls 1205 covering the auxiliary wirings 1206 were formed to have a width L1 of 330 μm.

Then, a temporary support substrate and the first electrode 1201 were attached using a separation adhesive. Then, the layer to be separated was separated from the formation substrate along the separation layer. Thus, the layer separated is provided on the temporary support substrate side.

Next, the layer which was separated from the formation substrate and where the insulating film 1224 was exposed was attached to the support substrate 1229 using a UV curable adhesive. As the support substrate 1229, a diffusion film of a polyester-based resin was used as described above. Then, the temporary support substrate was separated, whereby the first electrode 1201 was exposed over the support substrate 1229.

Next, the EL layer 1202 and the second electrode 1203 were formed over the first electrode 1201. As the EL layer 1202, a first EL layer including a light-emitting layer containing a fluorescent compound emitting blue light, an intermediate layer, and a second EL layer including a light-emitting layer containing a phosphorescent compound emitting green light and a light-emitting layer containing a phosphorescent compound emitting red light were stacked in this order from the first electrode 1201 side. Silver was used for the second electrode 1203.

Then, a photo-curable resin containing zeolite which serves as the sealant 1227 was applied and cured by UV light irradiation. Next, the support substrate 1229 and the substrate including the thin glass layer and the polyethylene terephthalate (PET) layer which was the sealing substrate 1228 were attached to each other using a UV curable adhesive.

Figure 11:
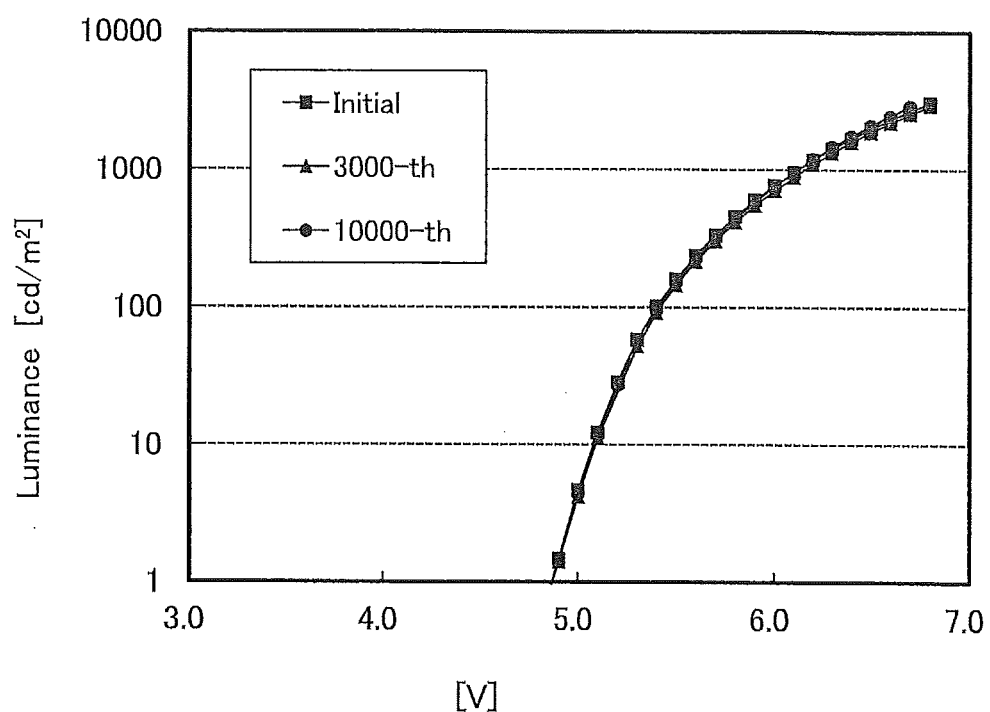
FIG. 11 is a graph showing luminance vs. voltage characteristics of a light-emitting panel in Example.
Figure 12:
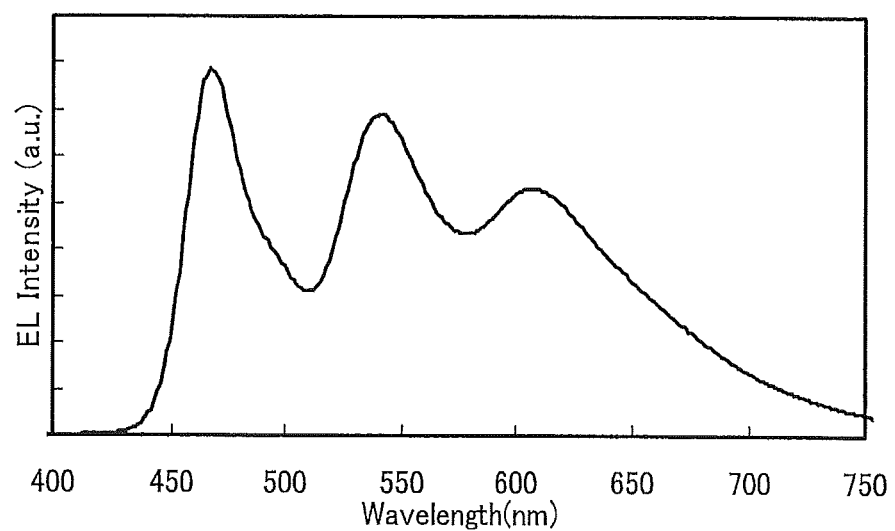
FIG. 12 is a graph showing an emission spectrum of a light-emitting panel in Example.

Operation characteristics of the light-emitting panel obtained in the above manner were measured. Voltage-luminance characteristics of the light-emitting panel are shown in FIG. 11 as indicated by "initial" in a legend. An emission spectrum of the light-emitting panel is shown in FIG. 12. As shown in FIG. 12, it is found that the light-emitting panel of this example shows an emission spectrum including light originating from the fluorescent compound emitting blue light, light originating from the phosphorescent compound emitting green light, and light originating from the phosphorescent compound emitting red light.

After that, a light-emitting device including the light-emitting panel was subjected to a reliability test. In the reliability test, the light-emitting panel was made to emit light 3000 times or 10000 times with intervals. For each time of light emission, a current of 2 A flowed in the light-emitting panel for 50 milliseconds (ms). The current density of the light-emitting element at this time was 90 mA/cm$^2$. The interval between light emissions (non-light-emitting period) was 10 seconds.

FIG. 11 shows voltage-luminance characteristics of the light-emitting panel after 3000 times of light emission and those after 10000 times of light emission.

It can be seen from FIG. 11 that the voltage-luminance characteristics of the light-emitting panel even after 10000 times of light emission does not significantly differ from those before the reliability test and that the light-emitting panel does not deteriorate. This supports that the light-emitting panel of this example has high reliability.

Example 2

In this example, an organic EL element that can be applied to one embodiment of the present invention is described.

In this example, the amount of current that can flow in an organic EL element emitting white light was examined. The light-emitting region of the used organic EL element was 2 mm×2 mm. For each light emission, current was made flow in the organic EL element for 50 milliseconds (ms).

As a result, a current of 60 mA was able to flow in the organic EL element (the corresponding current density was 1500 mA/cm$^2$). However, when a current of 68 mA flowed (the corresponding current density was 1700 mA/cm$^2$), the organic EL element was short-circuited.

Accordingly, in the light-emitting device of one embodiment of the present invention which includes an organic EL element, the amount of light can be adjusted within a range where a current density is less than 1700 mA/cm$^2$. Thus, a larger amount of current can flow in an organic EL element than in a light-emitting diode or the like using an inorganic material.

This application is based on Japanese Patent Application serial no. 2013-134799 filed with Japan Patent Office on Jun. 27, 2013, the entire contents of which are hereby incorporated by reference.

What is claimed is:

1. A semiconductor device having a photography function comprising:
    a current supply including a DC-DC converter configured to supply a current pulse;
    a driver circuit including a start switch and configured to supply a control pulse signal to the DC-DC converter in accordance with switching operation of the start switch; and
    a light-emitting portion configured to be supplied with the current pulse,
    wherein the light-emitting portion is configured to emit light for more than or equal to 1 millisecond and less than or equal to 1000 milliseconds as a flash in accordance with the current pulse when taking a photograph, and
    wherein an area of the light-emitting portion is greater than or equal to 0.5 cm$^2$ and less than or equal to 1 m$^2$.

2. The semiconductor device according to claim 1,
    wherein the light-emitting portion comprises a support substrate and a light-emitting element over the support substrate, and
    wherein the light-emitting element comprises a first electrode a second electrode overlapping with the first electrode, and an EL layer between the first electrode and the second electrode.

3. The semiconductor device according to claim 2,
    wherein the support substrate is a flexible substrate, and wherein the light-emitting portion has a curved surface.

4. The semiconductor device according to claim 1,
    wherein the current supply further comprises an AC-DC converter.

5. A camera comprising the semiconductor device according to claim 1.

6. A semiconductor device having a photography function comprising:
    a current supply including a DC-DC converter configured to supply a current pulse;
    a driver circuit including a start switch and configured to supply a control pulse signal to the DC-DC converter in accordance with switching operation of the start switch;
    a light-emitting portion configured to be supplied with the current pulse; and
    an optical sensor configured to detect a brightness around the semiconductor device,
    wherein the light-emitting portion is configured to emit light for more than or equal to 1 millisecond and less than or equal to 1000 milliseconds as a flash in accordance with the current pulse when taking a photograph, wherein an area of the light-emitting portion is greater than or equal to 0.5 cm² and less than or equal to 1 m², and wherein an amount of the light is configured to be adjusted by the detected brightness.

7. The semiconductor device according to claim 6, wherein the light-emitting portion comprises a support substrate and a light-emitting element over the support substrate, and wherein the light-emitting element comprises a first electrode a second electrode overlapping with the first electrode, and an EL layer between the first electrode and the second electrode.

8. The semiconductor device according to claim 7, wherein the support substrate is a flexible substrate, and wherein the light-emitting portion has a curved surface.

9. The semiconductor device according to claim 6, wherein the current supply further comprises an AC-DC converter.

10. A camera comprising the semiconductor device according to claim 6.

11. A semiconductor device having a photography function comprising:

a current supply including a DC-DC converter configured to supply a current pulse;

a driver circuit including a start switch and configured to supply a control pulse signal to the DC-DC converter in accordance with switching operation of the start switch;

a light-emitting portion configured to be supplied with the current pulse; and an distance sensor configured to detect a distance from the semiconductor device to a subject for photograph, wherein the light-emitting portion is configured to emit light for more than or equal to 1 millisecond and less than or equal to 1000 milliseconds as a flash in accordance with the current pulse when taking a photograph, wherein an area of the light-emitting portion is greater than or equal to 0.5 cm² and less than or equal to 1 m², and wherein an amount of the light is configured to be adjusted by the detected distance.

12. The semiconductor device according to claim 11, wherein the light-emitting portion comprises a support substrate and a light-emitting element over the support substrate, and wherein the light-emitting element comprises a first electrode a second electrode overlapping with the first electrode, and an EL layer between the first electrode and the second electrode.

13. The semiconductor device according to claim 12, wherein the support substrate is a flexible substrate, and wherein the light-emitting portion has a curved surface.

14. The semiconductor device according to claim 11, wherein the current supply further comprises an AC-DC converter.

15. A camera comprising the semiconductor device according to claim 11.

* * * * *